(12) United States Patent
Mandecki et al.

(10) Patent No.: US 12,166,528 B1
(45) Date of Patent: *Dec. 10, 2024

(54) ALL OPTICAL IDENTIFICATION AND SENSOR SYSTEM WITH POWER ON DISCOVERY

(71) Applicant: P-CHIP IP HOLDINGS INC., Chicago, IL (US)

(72) Inventors: Wlodek Mandecki, Princeton, NJ (US); Efrain Rodriguez, Bordentown, NJ (US); Robert Patti, Warrenville, IL (US); Ioannis Kymissis, New York, NY (US)

(73) Assignee: P-CHIP IP HOLDINGS INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/900,465

(22) Filed: Aug. 31, 2022

Related U.S. Application Data

(63) Continuation of application No. 17/466,725, filed on Sep. 3, 2021, now abandoned, which is a continuation of application No. 14/631,321, filed on Feb. 25, 2015, now Pat. No. 11,133,866.

(60) Provisional application No. 61/944,305, filed on Feb. 25, 2014.

(51) Int. Cl.
*H04B 10/114* (2013.01)
(52) U.S. Cl.
CPC .............................. *H04B 10/1143* (2013.01)

(58) Field of Classification Search
CPC ................................................... H04B 10/114
See application file for complete search history.

(56) References Cited

U.S. PATENT DOCUMENTS

| | | |
|---|---|---|
| 3,817,347 A | 6/1974 | Spencer |
| 4,870,367 A | 9/1989 | Nakase et al. |
| 4,905,445 A | 3/1990 | Saitoh |
| 5,484,403 A | 1/1996 | Yoakum et al. |
| 5,510,769 A | 4/1996 | Kajfez et al. |
| 5,641,634 A | 6/1997 | Mandecki |
| 5,771,002 A | 6/1998 | Creek et al. |
| 5,772,671 A | 6/1998 | Harmon |
| 6,016,949 A | 1/2000 | Slesinger |
| 6,261,492 B1 | 7/2001 | Iovdalsky |
| 6,270,472 B1 | 8/2001 | Antaki et al. |

(Continued)

FOREIGN PATENT DOCUMENTS

| | | |
|---|---|---|
| CN | 202226341 U | 5/2012 |
| EP | 1172759 | 1/2002 |

(Continued)

OTHER PUBLICATIONS

Jolley-Rogers et al., Ultra-small RFID p-Chips on the heads of entomological pins provide an automatic and durable means to track and label insect specimens, Zootaxa 3359, 2012 (Year: 2012).*

(Continued)

*Primary Examiner* — Shi K Li
(74) *Attorney, Agent, or Firm* — DLA Piper LLP (US)

(57) ABSTRACT

An apparatus and system having an optical integrated circuit (referred to herein as an OMTP) configured for power on during discovery and optically communicating with the OMTP reader for the purpose of extracting data.

19 Claims, 10 Drawing Sheets

(56) References Cited

U.S. PATENT DOCUMENTS

| | | |
|---|---|---|
| 6,273,712 B1 | 8/2001 | Rach et al. |
| 6,295,272 B1 | 9/2001 | Black et al. |
| 6,297,737 B1 | 10/2001 | Irvin |
| 6,850,160 B2 | 2/2005 | Rubinstein |
| 6,990,866 B2 | 1/2006 | Kibblewhite |
| 7,098,394 B2 | 8/2006 | Armer et al. |
| 7,118,767 B2 | 10/2006 | Kim |
| 7,126,755 B2 | 10/2006 | Moon |
| 7,174,238 B1 | 2/2007 | Zweig |
| 7,180,379 B1 | 2/2007 | Hopper |
| 7,382,258 B2 | 6/2008 | Oldham et al. |
| 7,412,898 B1 | 8/2008 | Smith et al. |
| 7,441,462 B2 | 10/2008 | Kibblewhite |
| 7,663,487 B2 | 2/2010 | Morris et al. |
| 7,791,481 B2 | 9/2010 | Landt et al. |
| 7,819,328 B2 | 10/2010 | Levinson |
| 7,849,807 B2 | 12/2010 | Suzuki et al. |
| 7,880,617 B2 | 2/2011 | Morris |
| 7,934,658 B1 | 5/2011 | Bhatti et al. |
| 8,027,591 B2 | 9/2011 | Maryfield |
| 8,103,167 B2 | 1/2012 | Tidhar |
| 8,330,111 B2 | 12/2012 | Ojefors et al. |
| 8,353,917 B2 | 1/2013 | Mandecki et al. |
| 8,402,612 B2 | 3/2013 | Wein et al. |
| 8,608,080 B2 | 12/2013 | Finn |
| 8,677,139 B1 | 3/2014 | Kalocsai |
| 8,704,665 B2 | 4/2014 | Yang |
| 8,711,046 B2 | 4/2014 | Copeland et al. |
| 8,724,038 B2 | 5/2014 | Ganapathi et al. |
| 8,785,352 B2 | 7/2014 | Mandecki |
| 9,418,321 B1 | 8/2016 | Gruda et al. |
| 9,939,379 B2 | 10/2018 | Kopacka et al. |
| 10,193,695 B1 | 1/2019 | Endress et al. |
| 10,554,405 B1 | 2/2020 | Endress et al. |
| 11,133,866 B2 | 9/2021 | Mandecki et al. |
| 11,483,072 B1 * | 10/2022 | Mandecki .......... H04B 10/1143 |
| 11,546,129 B2 | 1/2023 | Mandecki et al. |
| 2001/0044109 A1 | 11/2001 | Mandecki |
| 2002/0006673 A1 | 1/2002 | Mandecki |
| 2002/0049411 A1 | 4/2002 | Lamoureux et al. |
| 2002/0064482 A1 | 5/2002 | Tisone et al. |
| 2003/0029063 A1 | 2/2003 | Takesada et al. |
| 2003/0062988 A1 | 4/2003 | Mandecki et al. |
| 2003/0063551 A1 | 4/2003 | Takeuchi |
| 2004/0029109 A1 | 2/2004 | Derhsing |
| 2004/0052203 A1 | 3/2004 | Brollier |
| 2004/0082296 A1 | 4/2004 | Twitchell |
| 2004/0101966 A1 | 5/2004 | Davis et al. |
| 2004/0179267 A1 | 9/2004 | Moon |
| 2005/0150740 A1 | 7/2005 | Finkenzeller et al. |
| 2005/0157304 A1 | 7/2005 | Xiao et al. |
| 2005/0200421 A1 | 9/2005 | Bae et al. |
| 2005/0242963 A1 | 11/2005 | Oldham et al. |
| 2005/0258939 A1 | 11/2005 | Kantrowitz |
| 2006/0004370 A1 | 1/2006 | Bagby |
| 2006/0023219 A1 | 2/2006 | Meyer et al. |
| 2006/0053025 A1 | 3/2006 | Mertens |
| 2006/0062582 A1 | 3/2006 | Suzuki et al. |
| 2006/0080819 A1 | 4/2006 | McAllister |
| 2006/0084934 A1 | 4/2006 | Frank |
| 2006/0256338 A1 | 11/2006 | Gratton et al. |
| 2006/0292559 A1 | 12/2006 | Reddy et al. |
| 2007/0021929 A1 | 1/2007 | Lemmo et al. |
| 2007/0141760 A1 | 6/2007 | Ferguson et al. |
| 2007/0225055 A1 | 9/2007 | Weisman |
| 2007/0269217 A1 | 11/2007 | Yu et al. |
| 2008/0012577 A1 | 1/2008 | Potyrailo |
| 2008/0025729 A1 | 1/2008 | Funada |
| 2008/0030305 A1 | 2/2008 | O'Connor |
| 2008/0061939 A1 | 3/2008 | Davis et al. |
| 2008/0112300 A1 | 5/2008 | Kumhyr et al. |
| 2008/0165059 A1 | 7/2008 | Karr |
| 2008/0174436 A1 | 7/2008 | Landt et al. |
| 2008/0254400 A1 | 10/2008 | Scherl et al. |
| 2008/0304527 A1 | 12/2008 | Gao et al. |
| 2008/0307117 A1 | 12/2008 | Muller-Cohn et al. |
| 2009/0021374 A1 | 1/2009 | Stagg |
| 2009/0112179 A1 | 4/2009 | Zoltan et al. |
| 2009/0225415 A1 | 9/2009 | Hughes et al. |
| 2009/0243729 A1 | 10/2009 | Gao et al. |
| 2009/0278662 A1 | 11/2009 | Sanchez et al. |
| 2010/0038426 A1 | 2/2010 | Casden |
| 2010/0142967 A1 | 6/2010 | Perez |
| 2010/0214062 A1 | 8/2010 | Hayashida |
| 2010/0218623 A1 | 9/2010 | Eggers et al. |
| 2010/0306112 A1 | 12/2010 | Tseng |
| 2010/0316220 A1 | 12/2010 | Yoon et al. |
| 2010/0322494 A1 | 12/2010 | Fauver et al. |
| 2011/0013911 A1 | 1/2011 | Alexander et al. |
| 2011/0169657 A1 * | 7/2011 | August .............. G06Q 10/087 340/854.6 |
| 2011/0201106 A1 | 8/2011 | Sohn et al. |
| 2012/0041111 A1 | 2/2012 | Christensen et al. |
| 2012/0069397 A1 | 3/2012 | Bury |
| 2012/0132718 A1 | 5/2012 | Manzi |
| 2012/0224868 A1 | 9/2012 | Proesel et al. |
| 2013/0057348 A1 | 3/2013 | Proesel et al. |
| 2013/0181838 A1 | 7/2013 | Luke et al. |
| 2013/0230167 A1 | 9/2013 | Bauchot et al. |
| 2013/0255079 A1 | 10/2013 | Maijala et al. |
| 2013/0330072 A1 | 12/2013 | Xia et al. |
| 2013/0332018 A1 | 12/2013 | Kim |
| 2014/0001272 A1 | 1/2014 | Prestros |
| 2014/0049323 A1 | 2/2014 | Proesel et al. |
| 2014/0106470 A1 | 4/2014 | Kopacka et al. |
| 2014/0119746 A1 | 5/2014 | Kalogerakis et al. |
| 2014/0374571 A1 | 12/2014 | Okamoto et al. |
| 2015/0086971 A1 | 3/2015 | Botma |
| 2015/0134552 A1 | 5/2015 | Engels et al. |
| 2015/0258835 A1 * | 9/2015 | Fischer .................. B42D 25/00 156/275.7 |
| 2016/0188838 A1 | 6/2016 | Bradley et al. |
| 2017/0064570 A1 | 3/2017 | Shen et al. |
| 2017/0091497 A1 | 3/2017 | Dixit |
| 2018/0167148 A1 | 1/2018 | Vannucci et al. |
| 2018/0085747 A1 | 3/2018 | Mandecki et al. |
| 2018/0091224 A1 | 3/2018 | Mandecki et al. |
| 2018/0144344 A1 | 5/2018 | Berardi et al. |
| 2018/0211718 A1 | 7/2018 | Heath |
| 2018/0247509 A1 | 8/2018 | Ashkenazi et al. |
| 2019/0104572 A1 | 4/2019 | Clark et al. |
| 2019/0138778 A1 | 5/2019 | Lohar |
| 2019/0195745 A1 | 6/2019 | Hendrickx et al. |
| 2019/0325280 A1 | 10/2019 | Fan et al. |
| 2019/0378146 A1 | 12/2019 | Vinogradov et al. |
| 2020/0020229 A1 | 1/2020 | Groeneweg |
| 2020/0202291 A1 | 6/2020 | Yamamoto et al. |
| 2021/0042481 A1 | 2/2021 | Danaei-Moghaddam |
| 2021/0150298 A1 | 5/2021 | Salimi Jazi |
| 2021/0282236 A1 | 9/2021 | Clark et al. |
| 2022/0085992 A1 | 3/2022 | Eibon et al. |
| 2022/0224503 A1 | 7/2022 | Mandecki et al. |
| 2022/0224504 A1 | 7/2022 | Mandecki et al. |

FOREIGN PATENT DOCUMENTS

| | | |
|---|---|---|
| GB | 2138205 A | 10/1984 |
| JP | H0626256 U | 4/1994 |
| TW | 200817159 A | 4/2008 |
| WO | WO-0237721 A1 | 5/2002 |
| WO | 03036861 A1 | 5/2003 |
| WO | 2005119588 A1 | 12/2005 |
| WO | WO-2011/137325 | 11/2011 |
| WO | WO-2017153971 | 9/2017 |

OTHER PUBLICATIONS

Braeckmans, K, DeSmedt, SC, Leblans, M, Pauwels, R, Demeester, J. "Encoding microcarriers: present and future technologies". Nature Reviews Drug Discovery; (1); p. 447-456; (2002).

Collins, Jonathan, Putting Tags on Test Tubes, RFID Journal Live! Europe, asserting a date of Apr. 29, 2004, Dexter House, London,

(56) References Cited

OTHER PUBLICATIONS

England, Downloaded from:www.ilidiournaLcomiarticiesiview? 922. (blow-up of test tube image attached as second page).
Gao, Y., Al-Sarawi, S.F. & Abbott, D. Physical unclonable functions. Nature Electronics 3, 81-91 (2020) https://doi.org/10.1038/s41928-020-0372-5.
International Search Report and Written Opinion for PCT/US21/48865, mailed Feb. 1, 2022.
International Search Report and Written Opinion mailed Jun. 15, 2011 for Application PCT/US2010/049942.
International Search Report and Written Opinion mailed Jul. 26, 2021 for Application No. PCT/US2021/017752.
Mandecki, W, Barbara, A, Coradetti, T, Davidowitz, H, Flint, JA, Huang, Z, Kopacka, WM, Lin, X, Wang, Z, Darzynkiewicz, Z. "Microstransponders, the miniature RFID electronic chips, as platforms for cell growth in cytotoxicity assays" Cytometry Part A; (69A); p. 1097-1105; (2006).
PharmaSeq, Illustration of a microtransponder for DNA-probe assays, Feb. 5, 2001, http://web.archive.org/web/20010205050700/http://pharmaseq.com/il lustration. htm l.
Physical Unclonable Function: https://en.wikipedia.org/wiki/Physical_unclonable_function Retrieved on Jan. 27, 2022.
Image File Wrapper for U.S. Appl. No. 17/174,979, filed Feb. 12, 2021 (Feb. 12, 2021-Present) captured from PAIR on Mar. 1, 2022.
Image File Wrapper for U.S. Appl. No. 17/463,809, filed Sep. 1, 2021 (Sep. 1, 2021-Present) captured from PAIR on Mar. 1, 2022.
Image File Wrapper for U.S. Appl. No. 17/463,810, filed Sep. 1, 2021 (Sep. 1, 2021-Present) captured from PAIR on Mar. 1, 2022.
Image File Wrapper for U.S. Appl. No. 17/463,812, filed Sep. 1, 2021 (Sep. 1, 2021-Present) captured from PAIR on Mar. 1, 2022.
Image File Wrapper for U.S. Appl. No. 16/841,492, filed Apr. 6, 2020 (Apr. 6, 2020-Present) captured from PAIR on Mar. 1, 2022.
Image File Wrapper for U.S. Appl. No. 17/140,633, filed Jan. 4, 2021 (Jan. 4, 2021-Present) captured from PAIR on Mar. 1, 2022.
Image File Wrapper for U.S. Appl. No. 14/053,938, filed Oct. 15, 2013 (Oct. 15, 2013-Present) captured from PAIR on Mar. 1, 2022.
Image File Wrapper for U.S. Appl. No. 12/889,007, filed Sep. 23, 2010 (Sep. 23, 2010-Present) captured from PAIR on Mar. 1, 2022.
Image File Wrapper for U.S. Appl. No. 13/239,801, filed Sep. 22, 2011 (Sep. 22, 2011-Present) captured from PAIR on Mar. 1, 2022.
Image File Wrapper for U.S. Appl. No. 13/239,984, filed Sep. 22, 2011 (Sep. 22, 2011-Present) captured from PAIR on Mar. 1, 2022.
Image File Wrapper for U.S. Appl. No. 13/870,357, filed Apr. 25, 2013 (Apr. 25, 2013-Present) captured from PAIR on Mar. 1, 2022.
Image File Wrapper for U.S. Appl. No. 14/631,321, filed Feb. 25, 2015 (Feb. 25, 2015-Present) captured from PAIR on Mar. 1, 2022.
Image File Wrapper for U.S. Appl. No. 15/410,189, filed Jan. 19, 2017 (Jan. 19, 2017-Present) captured from PAIR on Mar. 1, 2022.
Image File Wrapper for U.S. Appl. No. 13/239,779, filed Sep. 22, 2011 (Sep. 22, 2011-Present) captured from PAIR on Mar. 1, 2022.
Image File Wrapper for U.S. Appl. No. 17/683,047, filed Feb. 28, 2022 (Feb. 28, 2022-Present) captured from PAIR on Mar. 1, 2022.
Image File Wrapper for U.S. Appl. No. 17/683,052, filed Feb. 28, 2022 (Feb. 28, 2022-Present) captured from PAIR on Mar. 1, 2022.
Image File Wrapper History of U.S. Appl. No. 17/174,979, filed Feb. 12, 2021 (Jun. 13, 2022-Present) captured from PAIR on Sep. 1, 2022.
Image File Wrapper for U.S. Appl. No. 17/140,633, captured from PAIR on Aug. 22, 2022 (From Jun. 13, 2022 to Present).
Image File Wrapper for U.S. Appl. No. 17/174,979, captured from PAIR on Jun. 8, 2022 (From Mar. 29, 2022 to May 17, 2022).
Image File Wrapper for U.S. Appl. No. 16/841,492, captured from PAIR on Jun. 8, 2022 (From May 13, 2022 to Jun. 6, 2022).
Image File Wrapper History of U.S. Appl. No. 14/631,321, filed Sep. 1, 2021 (Sep. 1, 2021-Present) captured from PAIR on Jan. 27, 2022.
U.S. Appl. No. 62/093,819, filed Dec. 18, 2014.
U.S. Appl. No. 17/463,812.
Office Action for Korean Patent Application No. 10-2022-7031762, mailed Jun. 21, 2024, 12 pages.
European Office Action for Application No. 21754158.0, dated Feb. 20, 2024, 1 page.
Extended European Search Report for Application No. 21754158.0, dated Feb. 1, 2024, 8 Pages.
U.S. Appl. No. 17/683,047, filed Feb. 28, 2022.
U.S. Appl. No. 17/830,047, filed Feb. 28, 2022.
U.S. Appl. No. 17/830,052, filed Feb. 28, 2022.
International Preliminary Report on Patentability for International Application No. PCT/US2010/049942, mailed Apr. 5, 2012, 7 Pages.
International Preliminary Report on Patentability for International Application No. PCT/US2021/017752, mailed Aug. 25, 2022, 8 Pages.
International Preliminary Report on Patentability for International Application No. PCT/US2021/048865, mailed Mar. 30, 2023, 9 Pages.
Mandecki W., et al., "All Optical Identification and Sensor System with Power on Discovery," U.S. Appl. No. 14/631,321, filed Feb. 25, 2015, 41 Pages.
Extended European Search Report for European Application No. 21869982.5, mailed Sep. 10, 2024, 7 pages.
Office Action for Taiwan Patent Application No. 110105330, mailed Aug. 29, 2024, 25 pages.
U.S. Appl. No. 17/463,810.
Taiwan Office Action in Application No. 110105330, dated Aug. 29, 2024.
U.S. Appl. No. 17/463,809.

* cited by examiner

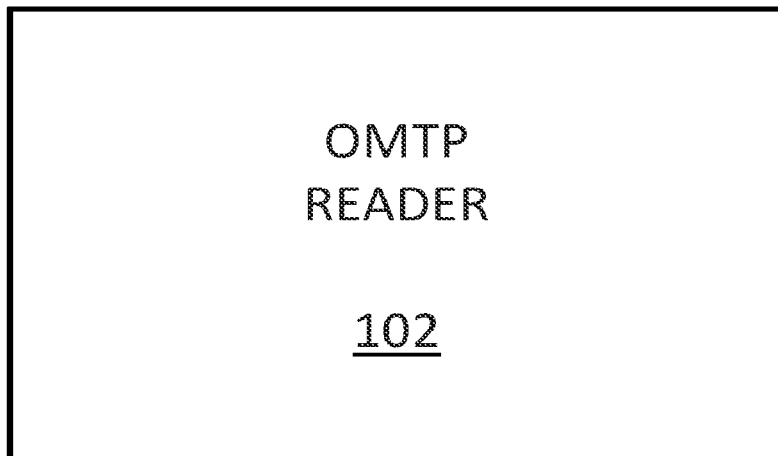
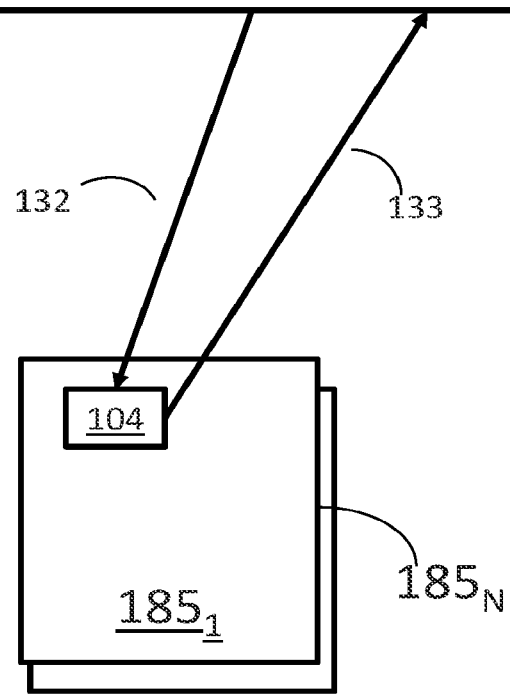
*Fig. 1A*
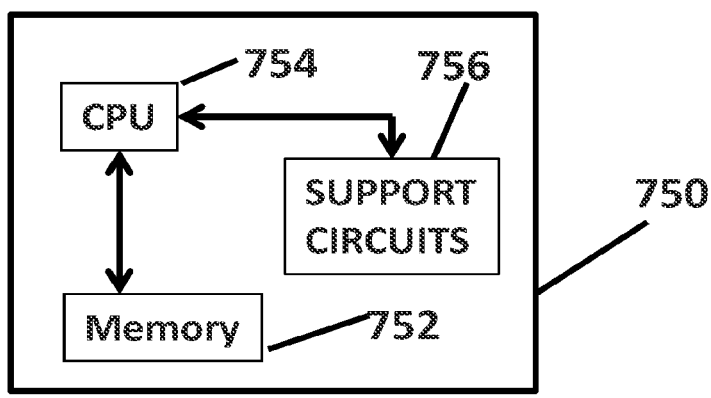
*Fig. 8*

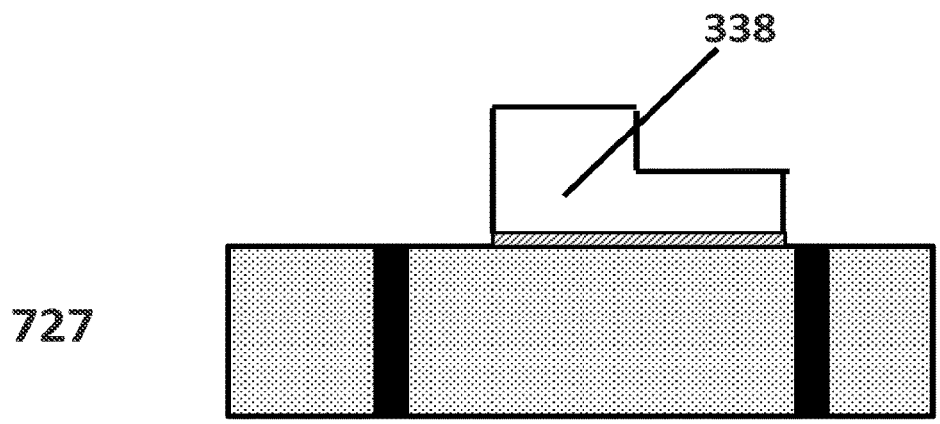
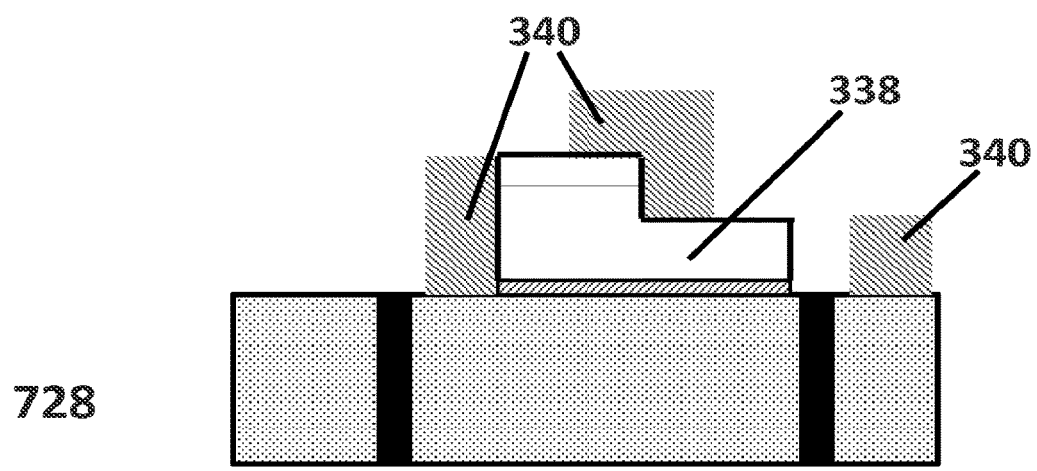
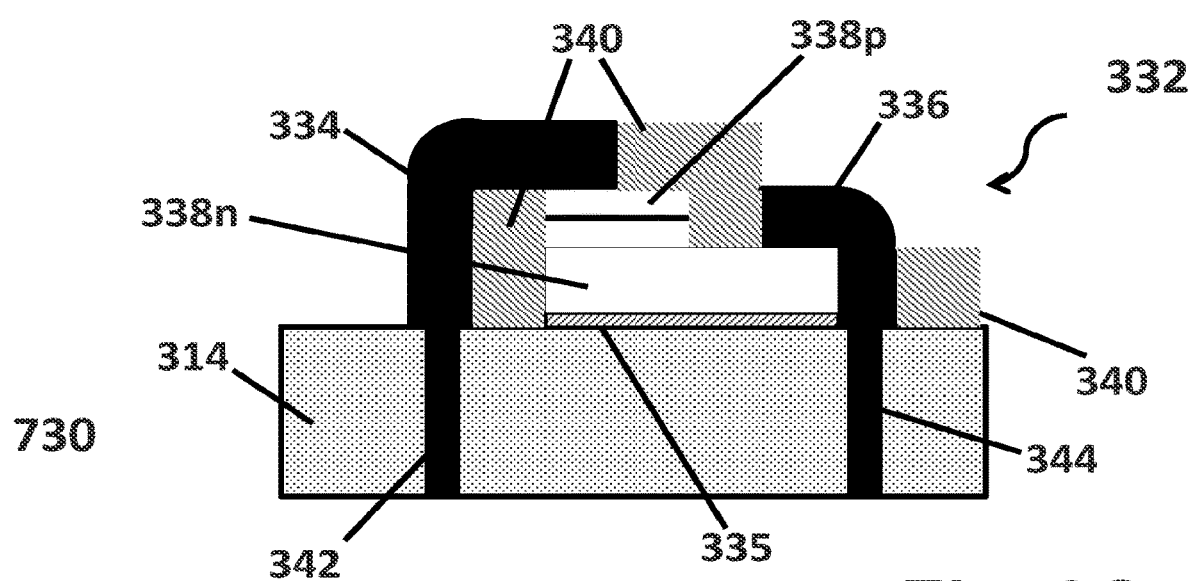
Fig. 3C

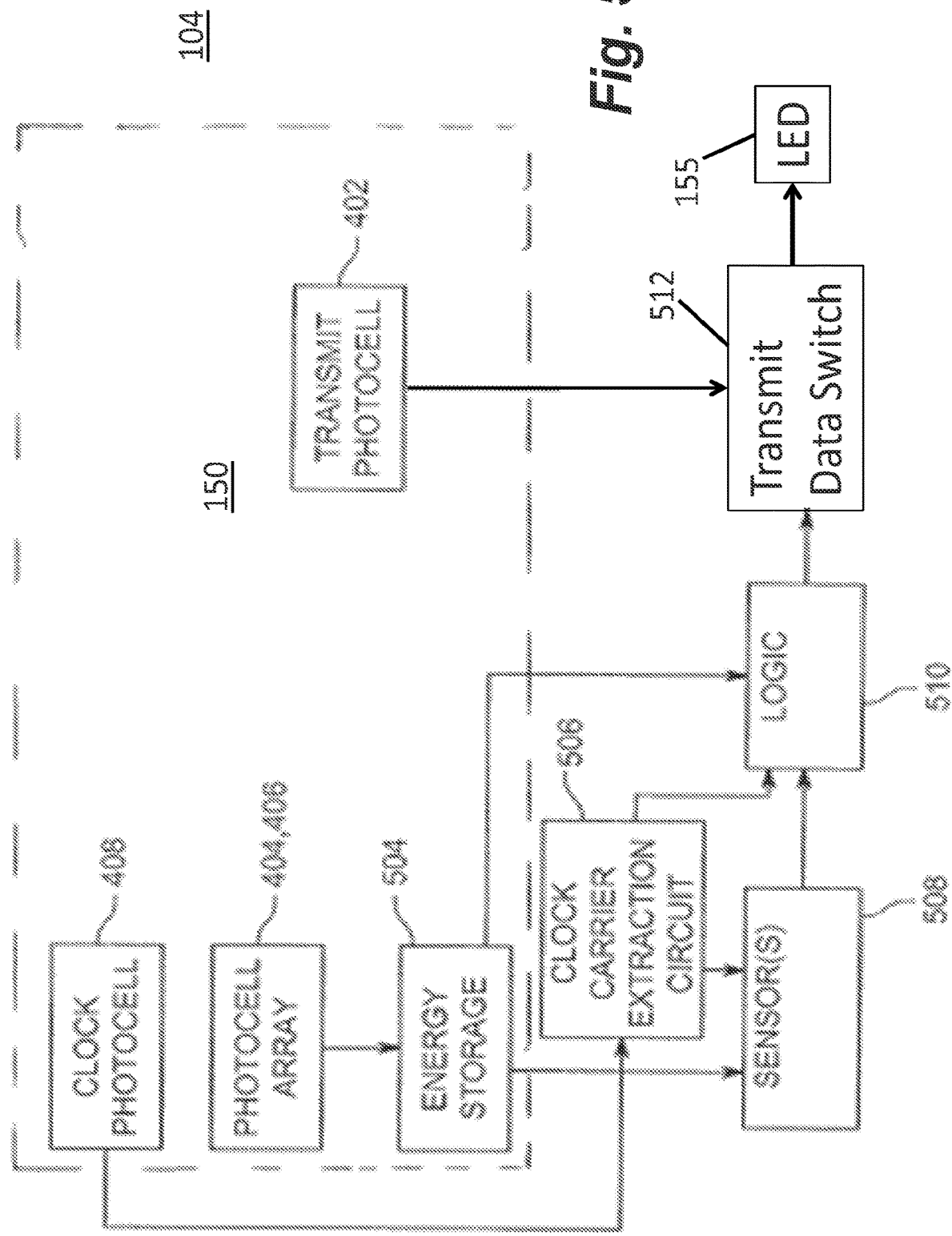

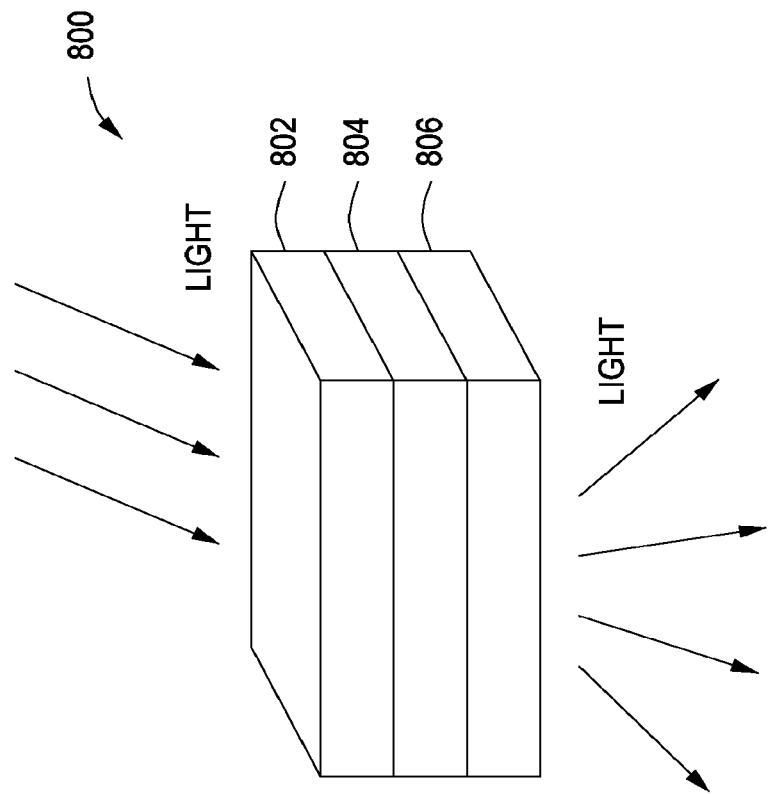
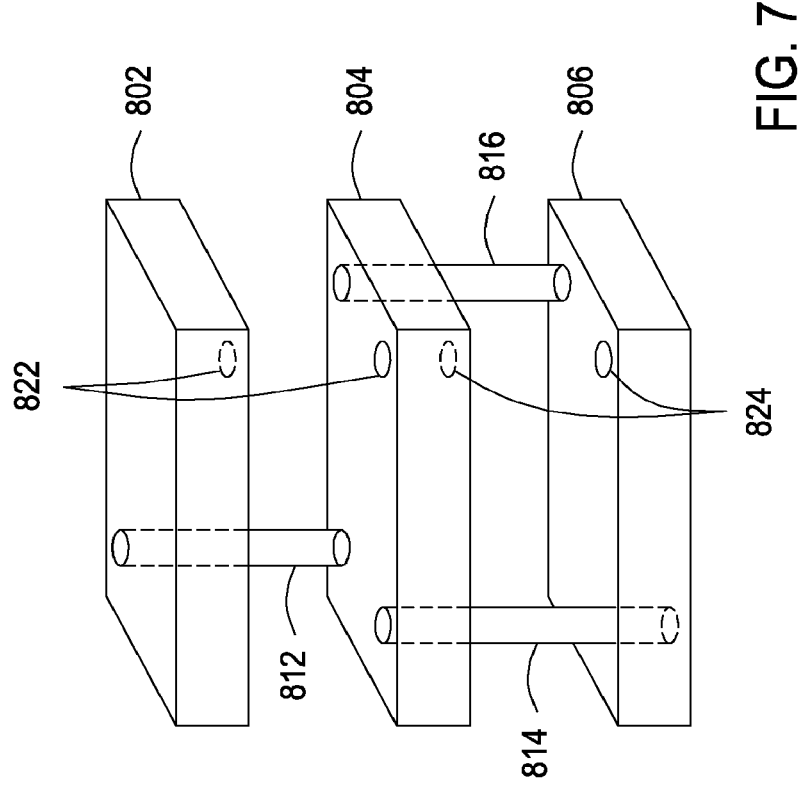
FIG. 7

ALL OPTICAL IDENTIFICATION AND
SENSOR SYSTEM WITH POWER ON
DISCOVERY

CROSS REFERENCE TO RELATED
APPLICATIONS

This application is a continuation of U.S. patent application Ser. No. 17/466,725, filed Sep. 3, 2021, which is a continuation of U.S. patent application Ser. No. 14/631,321, filed Feb. 25, 2015, now U.S. Pat. No. 11,133,866, issued Sep. 28, 2021, which claims the benefit of U.S. Provisional Patent Application Ser. No. 61/944,305, filed Feb. 25, 2014. Each of the forgoing are hereby incorporated herein by reference in their entireties.

This application is a continuation of co-pending U.S. patent application Ser. No. 14/631,321, filed Feb. 25, 2015, which claims benefit of U.S. Provisional Patent Application Ser. No. 61/944,305, filed Feb. 25, 2014, both of which are incorporated herein in their entirety.

Embodiments of the present invention generally relate to data collection and communication systems and, more particularly, to an all optical identification and sensor system with power on discovery.

Radio frequency identification (RFID) devices are common devices for tracking, labeling, and identifying multiple specimens or objects. These devices are often embedded in livestock or clothing and wirelessly communicate with an external reader using electromagnetic radio waves. However, opportunities for RFID tag miniaturization are often limited by a certain minimum antenna size requirements for achieving efficient operation and useful range. Another limitation is the achievable lifetime of available local energy storage. Effective radio communication is reliant on having a certain minimum antenna size and decreases in efficiency as antenna size is reduced such that below a certain physical size, radio communications become susceptible to failure due to insufficient link budget. The size required of an antenna is inversely proportional to frequency, thus directly proportional to wavelength.

Most often RFID devices occupy a physical space that is too large for practical tagging of smaller objects. In addition, research about biological processes in a single cell is most often accomplished indirectly by quantifying light using a variety of microscopic techniques.

Until now, direct measurements of certain characteristics of the milieu of a biological cell have been limited to methods using voltage clamp techniques, i.e., by placing a microelectrode inside the cell and sensing electrical parameters of the cell itself. However, this technique requires both electrical and mechanical contact with the cell at all times via conductive wires. In addition, because the technique used measures electrical parameters, there are constraints with regard to the type of measurements possible due to, for example, membrane potential which itself could bias the quantities being resolved as well as the need to carefully control any applied voltages and/or currents to avoid causing effects on the cell that might artificially bias data collection or even cause injury to the cell.

Therefore, there is a need in the art for an optical identification and sensor system with power on discovery that transmits data wirelessly to a data processor, able to be directly embedded within a cell.

SUMMARY OF THE INVENTION

Embodiments of the present invention comprise an optical identification and sensor system that powers on with a first light beam and substantially simultaneously with discovery, transmits data via a second light beam (referred to herein as an all-optical micro-transponder or "OMTP"). In some embodiments, the OMTP may be configured for implantation in a single cell and an OMTP reader for communicating with the OMTP. The OMTP may gather data from within the cell and transmits the data to a remote reader. Further embodiments include tagging of animals (e.g., sub-dermal), test tubes, microscope slides, tissue samples, and the like. While "tagging" shall mean including identification numbers such as for example inventory purposes, further embodiments with sensors (e.g., chemical, pH, temperature, and the like) allow for in-vivo real-time monitoring.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1A depicts a block diagram of operation of the OMTP sensor system in accordance with at least one embodiment of the invention;

FIGS. 3B and 3C depict an exemplary process flow assembly of the mounting of LEDs on the OMTP substrate in accordance with at least one embodiment of the invention;

FIG. 5 depicts a functional block diagram of an OMTP in accordance with at least one argument of the invention;

FIG. 7 shows a 3-layer OMTP;

FIG. 8 shows a controller/computer for use with the devices of the invention.

DETAILED DESCRIPTION

Figure 1B:
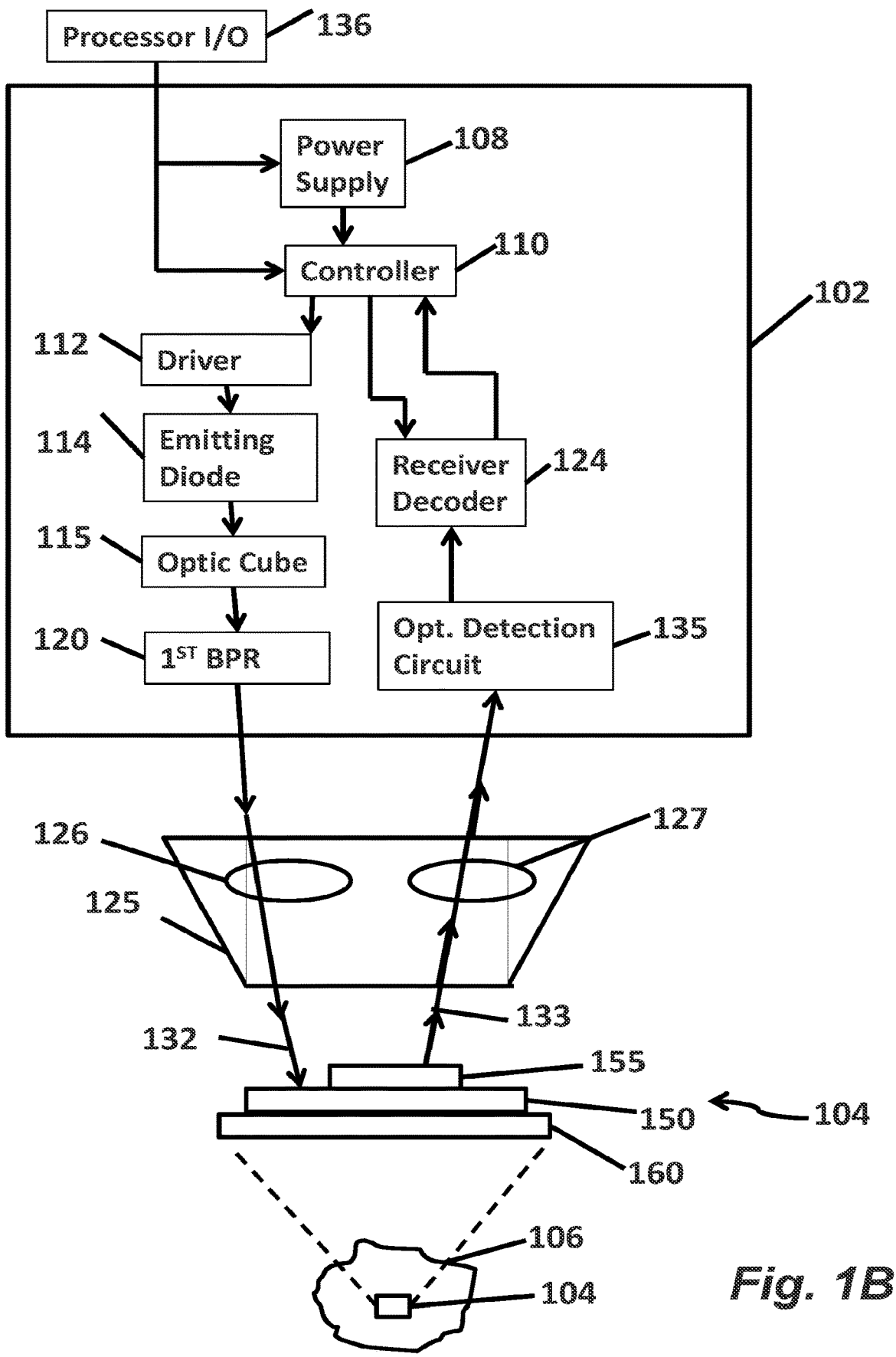
FIG. 1B depicts a block diagram of the reader portion of the OMTP sensor system in accordance with at least one embodiment of the invention.

FIG. 1A depicts a block diagram of operation of the OMTP sensor system 180 in accordance with at least one embodiment of the invention. The system 180 comprises an OMTP reader 102 and an OMTP 104. The OMTP 104 is depicted as being adhered to a first sample microscope slide $185_1$ of multiple sample slides $185_N$. Each slide respectively has one OMTP 104 with a unique identifiers such as an identification number or the like. Thus, each slide ($185_1 \ldots 185_N$) may be uniquely identified. The slide 185 is an example, and may be any number of sizes relative to the attached devices. Other example substrates include test animals, or objects that require individual unique identification data. For example, in the scenario of supply chain management of clothing, the OMTP 104 may be larger for easier location by visual inspection than on a microscope slide 185$_N$ (where its location is in many embodiments pre-set). Further embodiments discussed herein include one of the smallest examples of an OMTP 104, the implantation into a single biological cell.

As will be discussed further below, the OMTP 104 is an integrated circuit that is normally in a persistent dormant unpowered state, and is typically powered on when illuminated with an excitation beam 132 from the OMTP reader 102. In embodiments, the OMTP 104 is not reliant on battery energy storage, RF, or inductive power transfer to be powered. Upon illumination, the OMTP 104 instantly (e.g., much less than 1 second) powers on and transmits a data beam 133 via light from the OMTP 104. The data beam 133 in some embodiments may be an emission (e.g., from a light emitting diode (LED)) or in other embodiments, a reflection/absorption mechanism (e.g., shuttering via LCD). In alternative embodiments, the OMTP 104 receives a separate stimulus such as a code modulated onto the excitation beam 132 which initiates transmission of the sensor data. Alternatively, receiving data from a sensor triggers a transmission of the data beam 133.

In the depicted embodiment, excitation beam 132 is a visible laser beam and the data beam 133 is an infrared light beam emission (e.g., from an infrared emitting diode). The data beam 133 for example contains a signal to identify the specific OMTP 104 to the OMTP reader 102 using an identification number unique to the specific OMTP 104. Using the identification number, the OMTP reader 102 may transmit data to a computer to uniquely identify a given substrate. For example, a user may select a slide 185$_1$ containing a blood sample from a patient Y from a collection of slides 185$_N$ containing respective samples from patients X, Y, and Z. The user then operates the OMTP reader 102 to illuminate the OMTP 104 on the slide 185$_1$ with a light (e.g., a red laser beam) that causes the OMTP to transmit a data beam 133 via light (e.g., infrared). The data beam 133 is then received by the OMTP reader 102. The OMTP reader 102 then decodes the data beam 133 carrying identification data to unambiguously identify the slide 185$_1$ which carries a blood sample from patient Y as opposed to slides with blood from patients X and Z.

FIG. 1B depicts a block diagram of the reader portion of the OMTP sensor system in accordance with at least one embodiment of the invention. FIG. 1B includes an illustrative communication system 100 comprising integrated circuit (referred to hereinafter as OMTP 104) and an OMTP reader 102. The depicted embodiment in FIG. 1B is an example where the OMTP 104 is implanted into a biological cell 106. However, as discussed above, the OMTP 104 may be adhered, embedded, and otherwise attached to various objects for instant or rapid transmission of identification and/or accumulating and transmitting sensor data.

In some embodiments, the OMTP reader 102 may include an optical combiner 125 that includes focusing lenses (126 and 127) for respective excitation and data beams (132 and 133). In some embodiments, the OMTP 104 has dimensions to facilitate implantation in a single cell 106. As such, the OMTP 104 is approximately 100 µm or less (e.g., 20 µm) on each side. However, for larger cells, the OMTP 104 may be as large as 500 µm on each side. The OMTP 104 is enlarged in FIG. 1 to emphasize core components of a substrate 160, photocells 150, and optical communication circuit 155. The height of the OMTP can be for example approximately 20 µm-60 µm and dependent on the number of stacked layers and sensors for a particular OMTP.

The OMTP reader 102 transmits the excitation beam 132 to activate the OMTP 104 and typically provide power to the OMTP 104. In response to receiving the light 116, the OMTP 104 transmits data beam 133, such as for example an infrared beam, that is received by the OMTP reader 102. The distance between the OMTP reader 102 and the OMTP 104 can be for example on the order of 10 mm. The OMTP 104 can contain one or more sensors for gathering information about a cell. The OMTP 104 in such an embodiment can have an identification number that can be used to uniquely identify or "tag" particular cells in a culture.

Laser shall be defined herein as coherent directional light which can be visible light. A light source includes light from a light emitting diode (LED), solid state lasers, semiconductor lasers, and the like for communications. The excitation beam 132 in some embodiments may comprise visible laser light (e.g., 660 nm wavelength). The excitation beam 132 in operation may illuminate a larger area than that occupied by the OMTP 104. The larger illumination area (not shown) allows the user to easily localize and read the OMTP 104. FIG. 1 emphasizes the excitation beam 132 as illuminating the proper photocells 150, however other portions of the OMTP 104 may also be illuminated. In other embodiments, the excitation beam 132 may comprise other wavelengths of light in the visible and invisible spectrum necessary to supply sufficient power generation using photocells 150. For example, illumination with 60 mW average of focused optical power may generate a current of up to about 1 mA and a power point voltage of up to about 1.2V in the photodiodes of the OMTP 104. As will be discussed further below, energy harvested from the excitation beam 132 and photocells 150 is used to actively transmit the data beam 133 from the optical communication circuit 155. Additional embodiments include photocells 150 to detect and extract a synchronization signal. The optical communication circuit 155 may include a diode (not shown, e.g., infrared) and light modulation circuitry (not shown) such that the data beam 133 (e.g., 1300 nm IR light) is emitted with a different wavelength than the excitation beam 132 (e.g., 660 nm red light).

However, other wavelengths, such as the near-infrared (NIR) band, may be used for optical communication. Alternative embodiments may use reflective signaling methods to return a modulated data signal to the OMTP reader via gated reflections of the emissions of the excitation beam 132 from the reader 102. Gated Reflection methods may include shuttering via liquid crystals, micro-electromechanical system (MEMS) structures, micro-mirrors, reflectance/fluorescence of a modulated dye system, and electro-chromic approaches.

The OMTP reader 102 may comprise a power supply 108, a controller 110, a driver 112 (such as a laser driver), a diode 114 (such as a laser diode), a receiver/decoder 124, and an optical detection circuit. In some embodiments, the OMPTO reader 102 further includes a first band pass filter 120. The OMTP reader 102 in some embodiments is mounted to, or is made a part of, a stationary device (e.g., microscope, flow cytometer, and the like). In other embodiments, the OMTP reader 102 is a handheld device (e.g., in a wand form factor) that is typically connected to a standard personal computer or equivalent handheld device (not shown) via a wired or wireless interface. Both the mounted and handheld embodiments include a computer interface for input/out 136.

In one embodiment, the controller 110 is may be based on a microcontroller such as an 8051 microcontroller core by INTEL corporation in Santa Clara, California, which communicates with both the Field Programmable Gate Array (FPGA) based receiver/decoder 124 and the driver 112. In one embodiment, the driver 112 operates a diode 114 that emits approximately 60 mW average of optical energy (when actively reading) at a wavelength of 660 nm. In some embodiments, an optical collimation/focusing module (optic cube 115) may be positioned at the output of the diode 114 for the purpose of beam focusing, or redirection. In another option, an illumination system based on focused high-intensity LED emissions may be employed. Optic cube 115 may refer to beam prisms, amplification, redirection, and splitting devices. Optic cube refers generically to the interface between the reader's stimulus electronics and the OMTP, and the readback interface between the OMTP and the IR transducer/resolver assembly.

Light generated as the excitation beam 132 is passed through the optical cube 115 containing first optical bandpass filter 120 which may be a 660 nm red bandpass optical filter. For example, the filter removes any emissions from the response band, substantially at IR, assisting with disambiguation of the stimulus beam from the response beam. The excitation beam 132 may continue through the optical combiner 125. The optical combiner 125 can comprise focusing lenses (126 and 127) to further provide isolation between the excitation beam 132 and the data beam 133. The optical combiner may encompass an aperture of a path of the data beam 133 to reduce stray light while collecting signal light comprising the data beam 133. As will be discussed further below, spectral coding can be applied using an optical filter (not shown) within the optical detection circuit 135.

In one embodiment, the light of the excitation beam 132 is amplitude modulated at approximately 1 MHz. As shall be described with respect to the FIGS. 2-6 below, the excitation beam 132 is typically used to power the OMTP 104. The modulation may be gated, applied in bursts, or otherwise provide pulse sequencing that is readily extracted by suitably disposed photodiodes and extraction circuitry within the OMTP's logic. The timing of the laser emission pulse bursts are preferably set so that the emission durations and average laser power levels fall within requirements for registration as a class 3R laser device as defined in IEC standard 60825. Operation under class 3R does not require safety glasses.

Figure 2A:
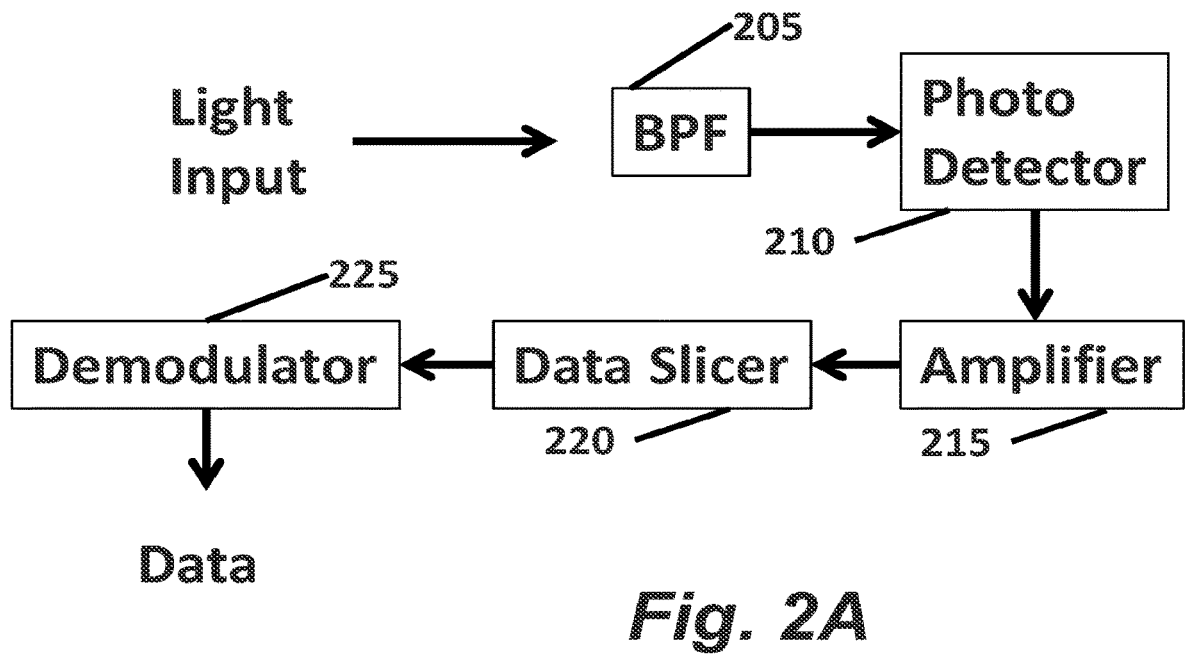
FIG. 2A depicts a block diagram of an optical detection circuit in accordance with at least one embodiment of the invention.

FIG. 2A depicts a functional block diagram of an illustrative optical detection circuit 135 in accordance with at least one embodiment of the invention. The optical detection circuit 125 operates as a receiver that comprises photo detector 210, amplifier 215, data slicer 220, and a demodulator 225. In some embodiments, the optical detection circuit 125 further includes a second band pass filter (BPF) 205. In operation, an IR (or NIR) signal (e.g., data beam 133) is received by the second band pass filter 205. The second BPF 205 comprises a corresponding IR or NIR optical BPF depending on the emitted light from the OMTP 104. The environmental light and excitation light from the excitation beam 132 incident on OMTP and host environment (e.g., cell 106) is thereby rejected.

The remaining data beam 133 is then detected by the photo detector 210. In some embodiments, the photo detector 210 is an IR photodiode, PIN diode, single junction detector, APD, or the like. The photo detector 210 is coupled to amplifier 215. In some embodiments, the amplifier 215 is a transimpedance amplifier to convert detected current from the photodiode into a measurable voltage that can subsequently be readily processed.

The output of amplifier 215 may be coupled to a data slicer 220. The signal is then sent to a demodulator 225 outputting extracted ID and sensor data for decoder 124. The extracted data includes but is not limited to merely the identification of the OMTP, sensor data, and the like. As will be discussed further below, alternative embodiments may include sub-dermal applications to animals that may include sensors for implantation and real-time detection of biological processes within a host.

Figure 2B:
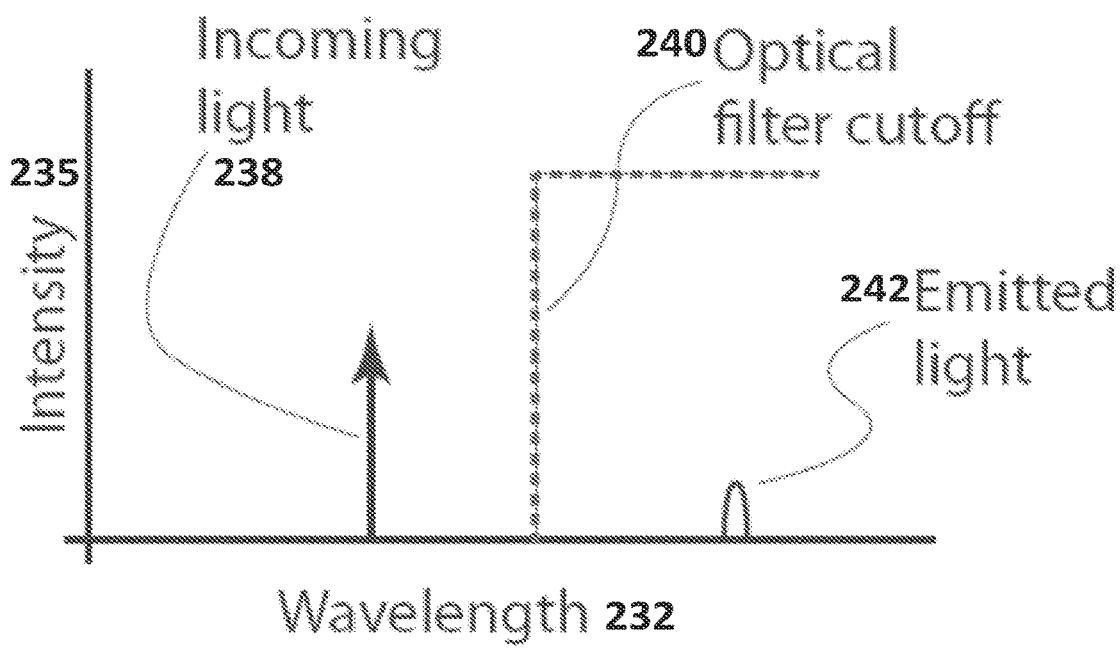
FIGS. 2B and 2C depict encoding of the light for communication from the OMTP in accordance with at least one embodiment of the invention.
Figure 2C:
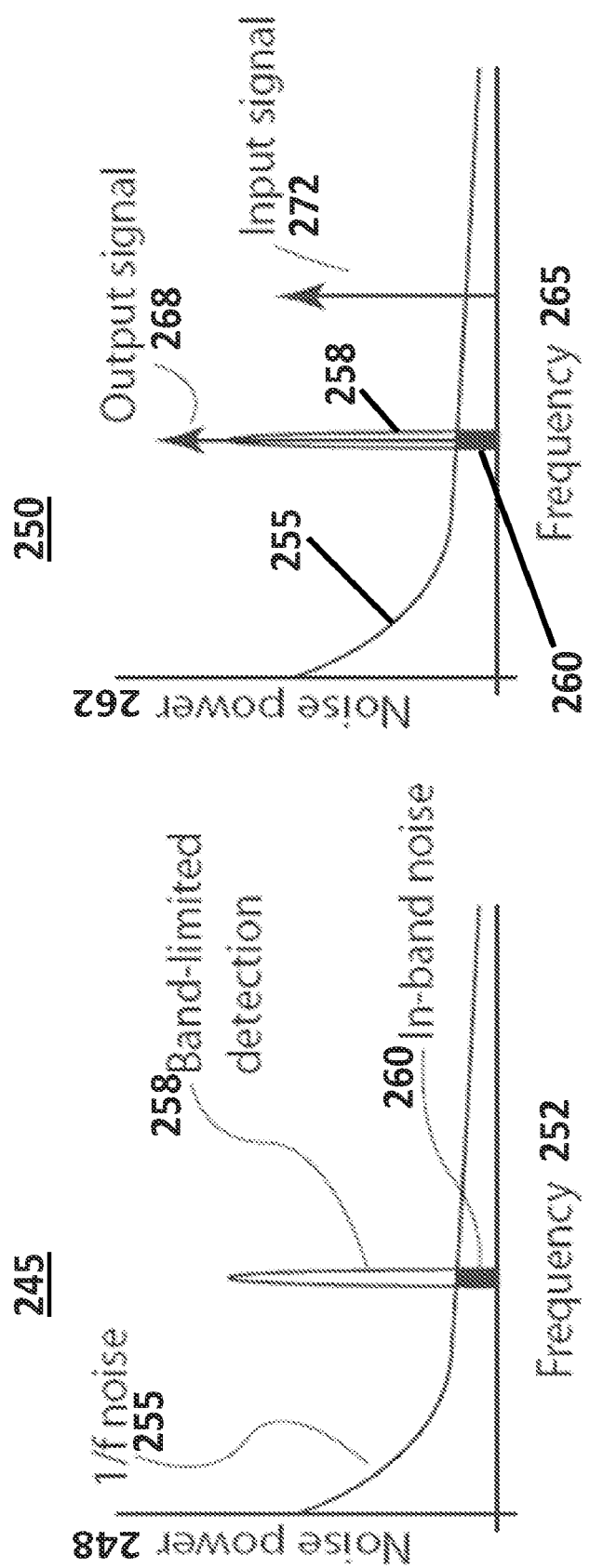

FIGS. 2B and 2C depict encoding of the light for communication from the OMTP in accordance with at least one embodiment of the invention. Encoding helps prevent interference occurring in the same optical wavelength when undesirable scattered light (from the operating environment or OMTP reading process) reaches photo detectors on the receiver. FIG. 2B depicts the results of spectral coding in a graph 230 of wavelength 232 versus light intensity 235. Spectral control is obtained using optical elements (e.g., optical BPF 205, optic cube 115, and the like) that are placed in the detector beam path. Spectral control can be for example effected by having the stimulus and response signals occur at different wavelengths, simplifying separation from one another. From the graph 230, the incoming light 238 (e.g., excitation beam 132) can be used for example for synchronization and energy delivery and is for example, of a shorter wavelength than the OMTP emitted light 242 (e.g., data beam 133). The optical filter cutoff 240 can provide a high blocking ratio (e.g., order of $10^5$, $10^6$) of in-band versus out-of-band light via long pass filters that yield the necessary spectral separation thus facilitating disambiguation of the weak IR data emissions from the OMTP from the strong excitation light and ambient light.

FIG. 2C includes graphs (245, 250) that depict signal/noise advantages from frequency encoding the signal of the excitation beam 132 for distinguishing a synchronization signal data beam within the excitation beam 132. First graph 245 is a plot showing the well-known 1/f noise characteristic along frequency axis 252. Band limited receiver inputs benefit signal demodulation because in a band-limited channel, noise is calculated as kTB. The noise power present in any bandwidth B is thus proportional to that bandwidth (and the operating temperature). Thus, if the signal is coded in a finite bandwidth B in the frequency domain, the signal can be selected out using Band pass filters thus reducing out of band noise, while further enhancing the signal to noise ratio through the use of synchronous demodulation techniques similar to lock-in amplifiers in the signal processor within the receiver. Such coding reduces the amount of noise 260 detected by the OMTP reader 102 in the presence of the signal emitted by OMTP 104, thus avoiding self-interference. Essentially, the data rate of the returning signal from the OMTP 104 can be different from the stimulus modulation frequency emitted by the OMTP reader permitting ready disambiguation of the response signals from the stimulus signals in the frequency domain via synchronous demodulation, and secondly, the stimulus and response wavelengths can be different permitting further disambiguation through the use of optical band-pass filters.

Graph 250 is a plot of the operating noise spectrum 255 across frequency 265 versus noise power 262. Graph 250 uses coding separation to separate the excitation beam 132 from the data beam 133. From the graph 250, band limited detection 258 is used to detect the incoming data signal from OMTP. The detected synch signal is shown as the frequency response peak 272 and the emitted signal for the data beam 133 is shown as frequency response peak 268. Spectral line 272 is the stimulus modulation at 1 MHz and 268 is the data bearing IR return signal. Thus, from the graph 250, coding separation in some embodiments may further reduce communication interference in the system 100 and correspondingly enhance probability of intercept of the desired OMTP emission.

Figure 3A:
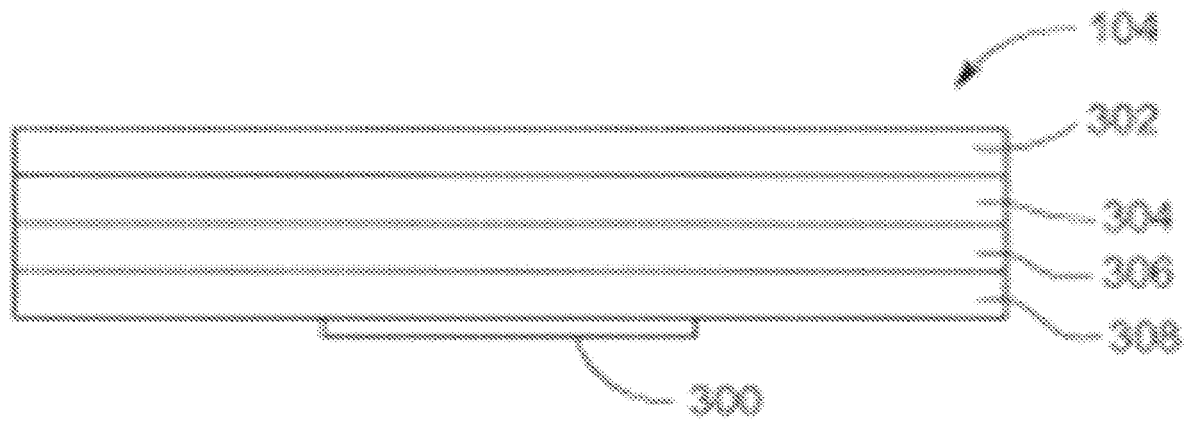
FIG. 3A depicts a cutaway view representation of an OMTP in accordance with at least one embodiment of the invention.

FIG. 3A depicts a side view representation of an illustrative OMTP 104 in accordance with at least one embodiment of the invention. The OMTP 104 comprises a stack of individual integrated circuit layers 300, 302, 304, 306, 308. The layer 302 for example supports an emission/reflection layer and photocells; the layer 304 can comprise logic, clock, sensors, and transmitter circuits; layers 306 and 308 can comprise storage capacitors; and layer 308 can also support the sensor electrodes 300. Those of skill in the art will recognize that functions of the OMTP can be organized into layers of other configurations. As illustrated in FIG. 1, the stacking may comprise layers of differing thicknesses uniformly overlaid so as to be manufacturable in a 3D IC process well-known in the art.

The OMTP 104 can be manufactured for example using mixed-signal manufacturing technology that is typically used to make three-dimensional (3D) integrated, 55 nm, dynamic random access memory (DRAM) and 65 nm mixed-signal process devices. In an illustrative embodiment, each layer is approximately 12 μm thick and 100 μm×100 μm in dimension. In one embodiment, dimensions of the OMTP 104 are 100×100×50 μm. Alternative embodiments may use more or less layers.

Figure 3B:
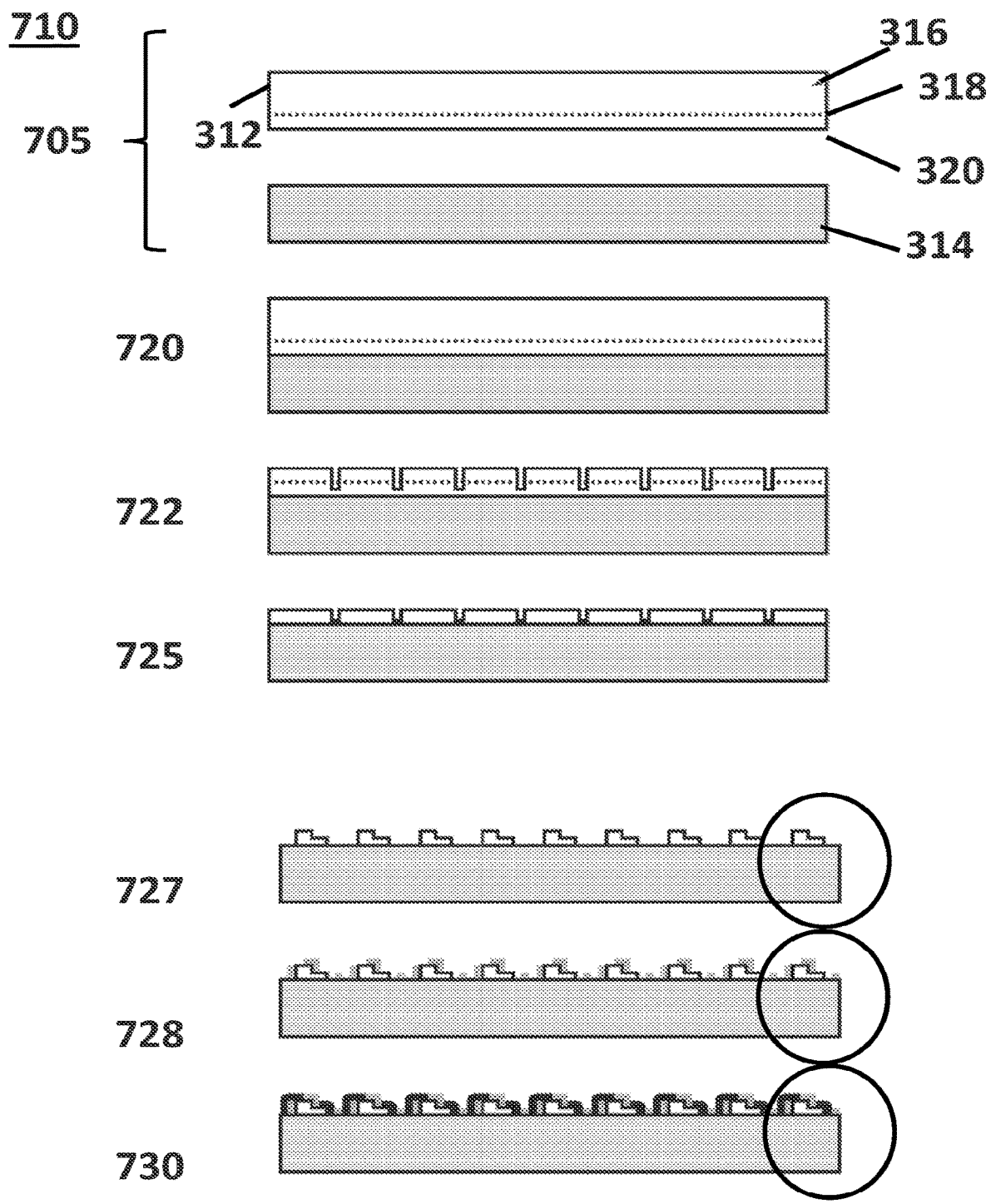

FIGS. 3B and 3C depict an exemplary process flow assembly 710 of the mounting of LEDs on the OMTP substrate in accordance with at least one embodiment of the invention. The process flow 710 is an exemplary monolithic process of bonding and patterning LEDs for emitting the data beam 133 using a loophole technique. In some embodiments, the LEDs may be organic LEDs (OLEDs) or other light emission device, e.g. a black body emitter. In this embodiment, in providing step 705, a compound semiconductor wafer 312 comprising a GaAs substrate 316, an AlAs release layer 318, LED layers 320 (with p- and n-junctions) and a silicon substrate 314 are bonded.

The exemplary process flow 710 begins at step 720 where the InGaAs and Si wafers (312 and 314) are bonded using an insulating adhesive (e.g., polyimide resin). Next, at step 722, vents are cut into the wafer 312 and thinned using back grinding. Then at step 725, the wafer 312 is released using high frequency etching to expose the p- and n-junctions on the backside. At step 727, LED mesas are patterned to singulate the LEDs. Then at step 728 an insulating layer is deposited and patterned to reveal contact bond pads. Lastly at step 730, the non-insulated voids in the pattern are metallized to form connections to the LEDs. Alignment is crucial for the formation and accurate bonding of the OMTP. In some embodiments, backside reference marks or IR through-wafer alignments may be used for the process flow 710.

FIG. 3C shows a detailed cross sectional view of steps 727, 727, 730, focusing on the end indicated by the circles in FIG. 3B. Step 730 provides an exemplary LED 332 on the OMTP 104 that emits at for example the IR or NIR band. The p- and n-regions (338p, 338n) are etched and exposed for topside contact and isolated by insulation 340. An adhesive 335 for example bonds the LED 338 to the Si substrate 314. P- and N-contacts (334, 336) are for example coupled to the Si substrate 314 using VIAs (342, 344). Such VIAs (342, 344) in some embodiments may be through-silicon VIAs (TSVs). The Si substrate 314 may be realized using a silicon-on-insulator (SOI) architecture so as to take advantage of the opportunity to develop higher operating voltages for use with shorter wavelength emitters, e.g. in visible wavelengths. In some embodiments, the OMTP 104 is bonded or adhered via adhesive to an object so as to operate as an identifier for the object.

Figure 4:
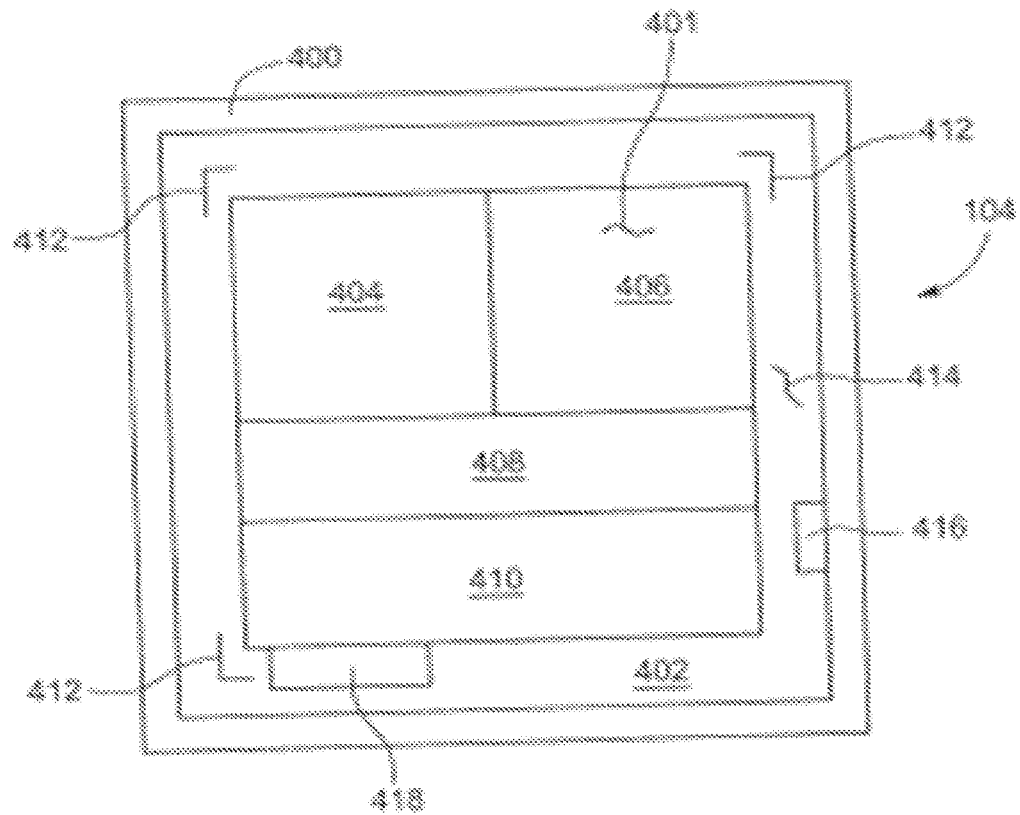
FIG. 4 depicts a top plan view representation of an OMTP in accordance with at least one embodiment of the invention.

FIG. 4 is a top plan view representation of an illustrative OMTP 104 in accordance with at least one embodiment of the invention. The view is of the top layer 302 of FIG. 3A. In one embodiment, the top layer 302 comprises an LED array 400 that circumscribes the periphery of the OMTP 104. In other embodiments, an LED array may be realized as a single LED or other topography for directed light emission. The placement of the LED array 400 depicts an example of an embodiment emphasizing light generation. Alternative embodiments may include varying topography layouts favoring power harvesting or capturing sensor data and the like. In some embodiments, the LEDs may include focusing lenses or other optics.

Centrally located on the top layer 302 is for example an array 401 of photocells 402, 404, 406, and 408. As illustrated, each photocell in array 401 is physically sized to create power for a particular circuit within the OMTP 104 and one is dedicated to clock/carrier signal extraction. Photocell 402, the largest in area, produces $V_{dd}$ for the electronic radiation transmitter (realized as a LED in the optical communication circuit 155). Photocell 406 produces an exemplary voltage, $V_{ss}$ for output transistor 416. Photocell 408 is used to extract clock pulses for logical state machine sequencing and photocell 404 produces another exemplary voltage, $V_{dd}$ for the logic and sensor circuits. As illustrated, the power cells are coupled to capacitors for example, in layers 306 or 308 for storing the energy produced by the photocells when illuminated by laser light, in embodiments, the clock photocell (408) is not low pass filtered as the power harvest elements are in order to permit extraction of clock pulse edges due to the stimulus light modulation. In some embodiments, energy extracted from the clock photocell (408) is applied to a differentiator (not shown) which extracts clock edges which are amplified and used to provide timing signals to the logical and sensing circuits. As illustrated, a plurality of identification fuses 418 is located on the surface 414. By opening select ones of these fuses, the OMTP is provided a unique identification code range beyond a default base page of code values that are hard-coded into the chip logic. In an alternative embodiment, the ID values may be electronically coded using electronic antifuse technology. Further still are embodiments with electronic memory for data, signal processing, and identification storage.

Exemplary logic area 410 can for example be covered in gold metallization. Angle chevrons 412 can for example be used as alignment targets during serialization of the wafer on a site-wise basis.

FIG. 5 depicts a functional block diagram of an illustrative OMTP 104 in accordance with at least one embodiment of the invention. The OMTP 104 comprises a set of photocells 150 (402, 404, 406, 408), energy storage 504, clock/carrier extraction network 506, sensors 508, logic 501, transmit switching circuit 512, and an LED 155 (e.g., IR).

The photocells 150 can include dedicated photocells such as a clock extraction photocell 408, energy harvesting photocell array 404, 406, and transmit photocell 402. As described above, the energy harvesting photocell array 404 and 406 may be coupled to energy storage 504 and may comprise photovoltaic cells. Photovoltaic cells convert light energy from illumination into an electron current.

One embodiment of a photocell-based integrated circuit power supply can be for example as described in commonly assigned U.S. Pat. No. 7,098,394, which is hereby incorporated herein by reference in its entirety. The clock photocell 408 detects a synchronization signal for the clock/carrier extraction circuit 506. In one embodiment, the energy storage 504 is a plurality of capacitors having at least one capacitor coupled to a photocell of the photocell array 404, 406. The energy stored in the energy storage unit 504 is coupled to the electronic circuits. Since the laser light is pulsed, the energy from the laser is accumulated and the OMTP 104 will operate on the stored energy. During the operation period, the transmitter switching circuit 512 via output transistor 416 can "dump" all of its energy into the IR LED 155. As the received laser pulse energy is extracted by the clock/carrier extraction circuit 506, the logical state machine forms data packets comprising the ID bits and sensor data and provides these to the transmit data switch for the formation of the transmission IR signal. The logic 510 may directly integrate the sensor and ID signal(s) into the composite data frame of the OOK (on-off keyed) light emitter. The modulation symbols are applied to the transmitter 512 and transmitted with each pulse of energy.

The sensor(s) 508 can comprise one or more sensors for measuring cell characteristics. In one embodiment, sensors 508 will have an assay time and power dissipation confined by the power source, such as an assay time of less than 10 ms and power dissipation of less than 4 µW at 1.2 V. The analog data from the sensor may be converted into a pulse width modulated signal or other binary signaling method that encodes the analog quantity in the time domain in a manner suitable for pulsing the IR emitting diode for direct transmission to the OMTP reader 102 without the need for traditional, power and area intensive analog to digital conversion techniques. Exemplary sensors include a dielectric sensor, a proportional to absolute temperature (PTAT) sensor, a pH sensor, a redox potential sensor, and/or light sensor. Various available sensors that can be integrated into the OMTP are described below.

A dielectric sensor monitors the dielectric constant of a custom-designed capacitor on the OMTP surface. External material, such as DNA or proteins, can be attached to the chip surface by an electric field or surface chemical coating. See for example, WO2011/137325 entitled "Metal Nanoparticle Structures for Enhancing Fluorescence-Based Assays" incorporated herein by reference in its entirety. As the external material influences the effective dielectric constant of the insulating material between two plates of the capacitance sensing circuit, the net capacitance changes. This influence can change with binding of materials to for example surface nucleic acid, protein, or other material. This change can be measured, in one embodiment, by having the quantity to be measured form the capacitive element in an RC time constant circuit where the capacitor is made of the sensor plates and the attached material itself. Ideally, the resultant RC product could be tuned to provide a nominal time constant in the 0.121 ms range, varying in accordance with the change in capacitance commensurate with the quantity being measured. The resulting variance in the timing, in turn, is used to control the duty cycle of an internally derived pulse signal that is used to modulate the emissions from the OMTP 104. The modulated emissions convey the sensor's data to the reader. Available clock references derived from the laser pulses are used as timing sources. This technique yields a potential sensor precision in the range of 14 bits as expressed in the digital domain. Dielectric sensors are sensitive to pH and ionic strength changes for similar reasons, and as such, broadly applicable. Unit-to-unit calibration may be needed, thus knowing the OMTP identification number can be additionally important. The calibration information (i.e., slope and intercept) for a particular OMTP sensor may be stored in a database and accessed based on the OMTP identification number.

In some embodiments, the OMTP 104 may be a subdermal implantation within a human or host animal in which the excitation beam 132 and data beam 133 operates at a sufficient power for the required skin penetration depth. The OMTP 104 may be passivated with $SiO_2$ to provide surface protection and insulation against the environment while providing a nonreactive surface. Openings in the passivation can be provided to allow for analysis of biological particles. In such embodiments, snapshot readings from biosensors may allow instant detection and monitoring of blood glucose, cholesterol, fats, temperature, blood alcohol content, and the like. For example, an implanted OMTP may include biosensors to provide blood diagnostics for diabetics, chemotherapy patients, radiation therapy patients, alcoholics, and the like. For example, an OMTP 104 with a temperature measuring sensor may exploit the temperature dependence of the voltage across a forward biased PN junction such as in a PTAT sensor. Temperature sensing elements in PTAT sensors comprise two different diode connected bipolar transistors. The two diodes are biased by two currents whose ratio is constant with temperature, so that the difference between the voltages across the two diodes is proportional to absolute temperature. A differencing amplifier extracts this voltage and this voltage is converted to a duty cycle with an integrating digitizer or other simple, low power analog to digital converter (ADC) element realized on-chip.

Alternatively, changes in resistance of an element on the OMTP 104 due to temperature change may be used to measure temperature with high sensitivity with operation as a thermistor.

In some embodiments, a pH sensor based on an ion sensitive field effect transistor (ISFET) can be arranged, where a small change in the input voltage due to pH variation, results in a larger change in current at the output. This is classic FET behavior, where the transconductance $(dI_o/dV_i)$ is the figure of merit. This property is well understood and very repeatable. The voltage dependence on pH is linear over a wide range. Another sensor topology suitable to integration is an intracellular oxidation (redox) potential sensor, a marker of exposure to ionizing radiation, including potential DNA damage and aging. Another sensor that may be used is a light sensor for imaging the inside of the cell, using existing photocell technology. Commonly realizable Silicon photodiodes have useful spectral response across the entire visible light band.

Each sensor produces an output that may be directly modulated onto the carrier frequency yielded by the clock extraction circuit 506 using appropriate modulation methods.

Figure 6:
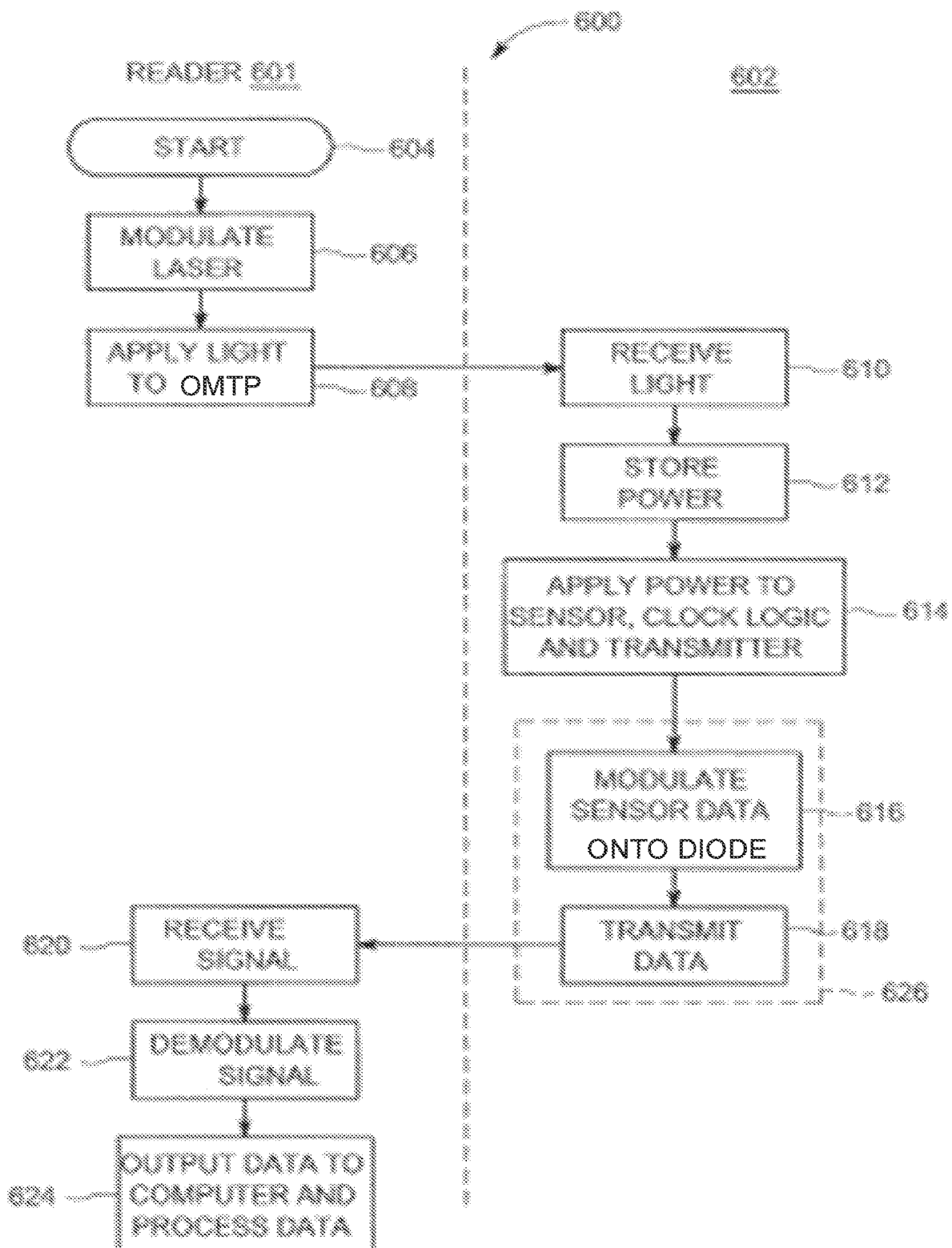
FIG. 6 depicts a flow diagram representing a method of operation of the communication system depicted in FIG. 1 in accordance with at least one embodiment of the invention.

FIG. 6 depicts an illustrative flow diagram of a method 600 of operation of the communication system 100 in FIG. 1 in accordance with at least one embodiment of the invention. The method 600 as a first portion 601 depicting the operation of the OMTP reader and a second portion 602 depicting the operation of the OMTP.

A method 600 begins with the reader portion 601 at step 604 and proceeds to step 606. At step 606, the laser is modulated at, for example, 1 MHz and, at step 608, light is applied from the laser to the OMTP. At step 610, the OMTP receives the light from the laser and, at step 612, stores the power generated by the laser light illuminating the photocells. In one embodiment, steps 604 through 612 are performed in approximately 1 μS At step 614, for example, the stored power is applied to the sensor(s), the clock, the logic, and a transmitter. At step 616, the method 600 outputs the sensor data as an IR signal using duty cycle modulation for the sensor data and NRZ data coding for the ID portion of the transmission. At step 618, the transmitter causes emission of the data by driving current into the IR diode over the period of a clock cycle. As represented by box 626, steps 616 and 618 can be performed simultaneously.

At step 620, the method 600 receives the signal transmitted from the OMTP and is filtered for step 622. At step 622, the OMTP receiver demodulates the received signal to extract the sensor and ID data. At step 624, the method 600 processes and stores the data typically using a computer that is connected to the OMTP reader. In this manner, in vivo cell information is collected and communicated to the reader for processing. Useful memory sizes include for example from 32 bits to as many as 256 or even more. 64 bits is sufficient for a large number of applications. On one wafer site, 10 mm×10 mm in size for example, 108 OMTPs can be made. The structure of one wafer may include 1,000 such sites, thus the total number of chips made from one wafer can approach 1011. Anticipating that thousands if not millions of such wafers are made, unique IDs are desirable. 64 bits provides up to 2×1019 different IDs. However, if the desire is to have more complex ID encoding to reduce the ID readout error rate, or a CRC (cyclic redundancy check) on the OMTP in addition to the ID, and if the number of wafers produced is even larger than stated above, then a 96 bit or 128 bit memory can be used for such a production series.

Complete encoding of the memory could include the sitewise ID and its CRC encoded during production of the CMOS wafer, as well the site number (within the wafer) and the wafer number. The latter two can be for example encoded electrically by virtue of having proper wiring within the streets of the wafer. In embodiments, on-chip memory can be made rewritable (e.g., RERAM), then the site and wafer IDs can be optically encoded at the site level, for example by illuminating the site with properly encoded modulated light.

Exemplary Small Embodiment

For many applications, such as in biology, chemistry or tagging, the smaller the OMTP the greater the utility. Smaller OMTPs are desirable from the perspective of multiplexing in chemical synthesis and bioassays, for their lower unit cost and in secure applications the implicitly covert nature of such a small size is particularly advantageous. The dimensions of the OMTP described herein can be for example on the order of 15×15×15 μm (micrometer, i.e., micron).

The micron sized all-optical OMTP can be built for example from three wafer fragments:

TABLE

1. A light energy receiving element that is a photocell made from compound semiconductor;
2. Logic including the memory, clock-decoding and signal generating circuits; this circuit is made using a CMOS process on silicon wafers;
3. A light-emitting element, such as an LED, also made from compound semiconductor.

An illustrative such OMTP 800 is shown in FIG. 7, formed with layer 802 (e.g., photocell layer), layer 804 (e.g., logic and memory layer) and layer 806 (e.g. LED layer). Layer 802 is, for example, made from a compound semiconductor such as GaAs. The wafer is thinned to 2 microns for example. The sizing of the OMTP provides a higher voltage and greater efficiency. The illustrative design provides the ability to stack the photodiode over the logic, which reduces the OMTP linear area. One light-receiving element can provide electrical power for all circuits on the chip.

In this and the other embodiments, a logic wafer can be plated with a layer of for example gold on one or both sides of the thinned wafer to protect the logic functions from the potentially disruptive effects of the illuminating light. Plating can spread across most of the primary surface, or selectively as needed for protection. In this and the other embodiments, a logic layer can include a power distribution control circuit that supplies sufficient power to both the logic elements and the LED elements.

In this and the other embodiments, the feature size of a suitable CMOS process can be for example 28 nm or less, such as 11 nm. The typical size of the CMOS wafer is 8" to 12". The wafer is thinned to 10 micron. Segments of the wafer are used for assembly as appropriate.

In this and the other embodiments, a great variety of LEDs exist and are applicable. They are capable of emitting light ranging from below 400 nm to 2000 nm and the chemical composition of the wafer can vary correspondingly. For example, the LED could be made from InP and emit IR at around 1300 nm. The LED wafer can be thinned for example to 2 micron.

In principle, light is emitted by the LED in all directions (e.g., IR light). However, in the exemplary configuration depicted in FIG. 7, since the gold coating of the middle IC layer will reflect light, the net result is that the light is emitted by the LED into the half-sphere, mostly in the opposite direction from the interrogating beam of light. If another direction is desired, other configuration can be used. For example, the LED can be placed as a middle of three layers, the light emitted by the LED directly and the light reflected by the protective (e.g., gold) coating on the integrated circuit containing the logic and memory will pass through (at least partially) the photocell layer, mostly towards the illuminating light source. In other embodiments, the protective plating on a logic layer can more selective or missing, such that LED light emissions pass through.

Illustrative layers 802 and 804 are connected for example by a single via 812 and two pads (822), as shown in FIG. 7. The diameter of a via is for example around 1 micron. Illustrative layers 804 and 806 are connected for example by a pair of vias (814, 816), and two pads (824), as shown in FIG. 7.

The ordering of the three layers can be different than that shown in FIG. 7. The photocell and LED layers are very thin and transparent to light or translucent, allowing for alternate configurations.

After the wafer-scale alignment of the wafers or wafer fragments, a three-wafer sandwich is formed. OMTPs are singulated through chemical or ionic dicing of the wafer sandwich, or an alternative method.

In embodiments, the OMTP (whether 3 layer or not) is about 80 micron or less in its longest dimension (length, width, height). In embodiments, it is about 60 micron or less, or about 50 micron or less, or about 40 micron or less, or about 30 micron or less, or about 20 micron or less, or about 15 micron in its longest dimension. In embodiments, the OMTP is constructed from three wafer fragments. Where the OMTP includes a sensor, in embodiments such an OMTP is constructed from four wafer fragments.

Additional Uses

The OMTPs can be used in combinatorial synthesis to generate a large number of compounds. Oligonucleotides (DNA and RNA), peptides and small chemical molecules can be synthesized in a precisely controlled manner. It is possible to sort the OMTPs in accordance with their IDs during the synthesis; this allows defined chemical compounds to be made on predetermined OMTPs. See, for example, U.S. Prov. Appn. 62/093,819, filed 18 Dec. 2014 (Genomic-Scaled Nucleic Acid Synthesis . . . ), the contents of which are incorporated herein in their entirety.

The OMTPs can be used in multiplex solid phase bioassays, e.g., ELISA. They can provide an attractive alternative or a replacement for the Luminex fluorescent bead in many assays. They can be used in DNA assays as well. See, for example, U.S. application Ser. No. 14/053,938, filed 15 Oct. 2013 (Compact Analyzer . . . ); and U.S. Pat. No. 8,785,352 (Metal Nanoparticle Structures for Enhancing Fluoresence Based Assays). The entire content of the aforementioned patent documents is incorporated herein in its entirety.

The OMTPs can be used for tagging variety of objects and animals. As tags on objects, they can be used to secure these same objects against counterfeit by identifying the provenance of the object unambiguously. The OMTPs can be placed on objects in predetermined locations, or mixed into a coating material, such as paint or ink. They can be sprinkled into paper during production.

For tagging or monitoring animals, they can be injected into the animal. In embodiments, the OMTPs are placed near the surface of the skin. See, for example, U.S. Pat. No. 8,353,917 (Apparatus and Method to Deliver a Microchip), the contents of which are incorporated herein in their entirety.

In embodiments, the OMTPs are embedded into the paper, plastic, cloth, other material, or composites thereof in a high security document, such as paper money, securities, id documents, passports, or the like. For example, the OMTPs can be impressed into the fibers of paper or cloth, such that they will not be displaced during use, or they can be placed during production. For plastics, they can for example be placed by lamination.

In embodiments, such OMTPS are about 80 micron or less in largest dimension. In embodiments, such documents are scanned for printed subject matter (serial number, 1 D or 2D bar code, or the like) and for the digital ids for the one or more OMTPs placed therein. An automated validation program retrieves the expected correspondence from a confidential database. In embodiments, the query sent to the database server(s) by a database authorized device is the information taken from the printed subject matter. The reply for example includes in encrypted form the OMTP ids. An authorized device can be configured to make the validating comparison without providing the id numbers to any user, merely providing a validation or rejection message or signal.

The device can incorporate the written subject matter reader, the OMTP reader (light query and emitted light reader), and validation programing (with the database typically remotely located). In embodiments, the device reads OMTPs that are correctly located on the document.

Various elements, devices, modules and circuits are described above in association with their respective functions. These elements, devices, modules and circuits are in embodiments considered means for performing their respective functions as described herein.

Controller/Computer

In any aspect that calls for a controller or computer, the devices of the invention can have a controller 750 (FIG. 8), which can comprise a central processing unit (CPU) 754, a memory 752, and support circuits 756 for the CPU 754 and is coupled to and controls the analyzer or, alternatively, operates to do so in conjunction with computers (or controllers) connected to the analyzer. For example, another electronic device can supply software, or operations may be calculated off-site with controller 750 coordinating off-sight computer operations with the local environment. The controller 750 may be one of any form of general-purpose computer processor, or an array of processors, that can be used for controlling various devices and sub-processors. The memory, or computer-readable medium, 752 of the CPU 754 may be one or more of readily available memory such as random access memory (RAM), read only memory (ROM), flash memory, floppy disk, hard disk, or any other form of digital storage, local or remote. The support circuits 56 are coupled to the CPU 54 for supporting the processor in a conventional manner. These circuits can include cache, power supplies, clock circuits, input/output circuitry and subsystems, and the like. Methods of operating the analyzer may be stored in the memory 752 as software routine that may be executed or invoked to control the operation of the devices. The software routine may also be stored and/or executed by a second CPU (not shown) that is remotely located from the hardware being controlled by the CPU 754. While the discussion in this patent application may speak of the "controller" taking certain actions, it will be recognized that it may take such action in conjunction with connected devices.

All ranges recited herein include ranges therebetween, and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4, . . . 1.1, 1.2, and the like, as well as 1, 2, 3 and the like, if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4 or more, or 3.1 or more.

FURTHER EMBODIMENTS, NUMBERED EMBODIMENTS

Any embodiment described herein that can logically be combined with another described herein, such that a person of ordinary skill would recognize that they can desirably be combined, are contemplated to within the invention. For example, any sizing for the integrated circuit described above is contemplated for all embodiments. The invention can be described further with reference to the following numbered embodiments:

Embodiment 1. An optical integrated circuit comprising: (A) an optical transmitter configured for sending data to an external optical receiving device, and (B) at least one photovoltaic power source powered by receiving light from a light source.

Embodiment 2. The integrated circuit of embodiment 1, further comprising memory and a logic circuit.

Embodiment 3. The integrated circuit of embodiment 2, wherein the logic circuit and memory is coupled to the optical transmitter for transmitting data comprising identification data unique to the integrated circuit.

Embodiment 4. The integrated circuit of one of the foregoing embodiments, further comprising at least one sensor measuring environmental data for transmission by the optical transmitter.

Embodiment 5. The integrated circuit of embodiment 4, wherein environmental data includes at least one of: temperature, dielectric conditions, protein, or blood glucose levels.

Embodiment 6. The integrated circuit of one of the foregoing embodiments, further comprising topology configured for at least two of: implanting into a biological cell, embedding into a sub-dermal skin, or adhesion to an object.

Embodiment 7. The integrated circuit of one of the foregoing embodiments, wherein the integrated circuit concurrently receives a synchronization signal and power from the light source as light operating at a first wavelength.

Embodiment 8. The integrated circuit of embodiment 7, wherein the optical transmitter sends a data signal with light at a second wavelength.

Embodiment 9. The integrated circuit of one of the foregoing embodiments, wherein the optical transmitter operates in the infrared spectrum and the optical receiver operates in the visible spectrum.

Embodiment 10. The integrated circuit of one of the foregoing embodiments, wherein upon powering by the at least one photovoltaic power source, the integrated circuit is configured to optically transmit identification data to an optical reader.

Embodiment 11. The integrated circuit of one of the foregoing embodiments, further comprising receiving at least one of clock data and coding data for subsequently controlling the optical transmitter to send data.

Embodiment 12. An optical communication system for communicating with an optical integrated circuit, the system comprising: (I) an optical integrated circuit comprising at least one photovoltaic power source and an optical transmitter; and (II) an optical reader comprising a laser light source powering the photovoltaic power source and a photosensor receiving light from the optical transmitter.

Embodiment 13. The system of embodiment 12, wherein the laser light source is modulated for simultaneously providing energy and timing signals to the optical integrated circuit.

Embodiment 14. The system of one of the foregoing embodiments 12 or 13, wherein the optical reader further comprises a decoder for decoding the received light from the optical transmitter into data.

Embodiment 15. The system of embodiment 14, wherein the data includes identification data unique to each optical integrated circuit.

Embodiment 16. The system of one of the foregoing embodiments 12-15, wherein the integrated circuit further comprises at least one sensor, the at least one sensor measuring the environment surrounding the optical integrated circuit.

Embodiment 17. The system of one of the foregoing embodiments 12-16, further comprising wherein the data receiver photosensor operates in the infrared light spectrum and the laser light stimulation source operates in the visible spectrum.

Embodiment 18. A method for communicating between an optical integrated circuit and an optical reader comprising: (A) illuminating the optical integrated circuit with directed light from a modulated laser source in the optical reader; (B) powering at least one photovoltaic cell of the optical integrated circuit (IC); and (C) transmitting a data signal with an optical transmitter of the optical integrated circuit that is powered by the at least one photovoltaic cell.

Embodiment 19. The method of embodiment 18, wherein, the transmitted data signal is received by a photosensor of the optical reader for decoding.

Embodiment 20. The method of one of the foregoing embodiments 18-19, wherein the data signal includes unique identification data of the optical integrated circuit and wherein the optical transmitter sends a data signal using light at a second longer wavelength.

Embodiment 21. The method circuit of one of the foregoing embodiments 18-20, wherein the optical receiver on the optical IC concurrently receives a synchronization signal at the optical receiver and power from the light source as light operating at a first wavelength.

Embodiment 22. The method of one of the foregoing embodiments 18-21, wherein the data signal further comprises data from a sensor coupled to the optical integrated circuit.

While the foregoing is directed to embodiments of the present invention, other and further embodiments of the invention may be devised without departing from the basic scope thereof, and the scope thereof is determined by the claims that follow.

Publications and references, including but not limited to patents and patent applications, cited in this specification are herein incorporated by reference in their entirety in the entire portion cited as if each individual publication or reference were specifically and individually indicated to be incorporated by reference herein as being fully set forth. Any patent application to which this application claims priority is also incorporated by reference herein in the manner described above for publications and references.

The invention claimed is:

1. An optical integrated circuit comprising:
one or more photovoltaic power sources configured to be powered by light received from a light source, the one or more photovoltaic power sources further configured to power one or more optical transmitters;
the one or more optical transmitters configured to transmit data to an external optical reading device, wherein each optical transmitter comprises a light emitting diode (LED) formed by a first layer mounted on a second layer having conductive portions therethrough to form p and n regions between the conductive portions, and wherein the one or more optical transmitters are configured to receive the power from the one or more photovoltaic power sources through corresponding conductive portions; and
one or more logic circuits configured to provide the data to be transmitted to the one or more optical transmitters.

2. The optical integrated circuit of claim 1, wherein the first layer is formed by one or more of Gallium Arsenide (GaAs), Indium Gallium Arsenide (InGaAs), Aluminum Arsenide (AlAs), Indium Phosphate (InP).

3. The optical integrated circuit of claim 1, wherein the one or more optical transmitters, the one or more logic circuits, and the one or more photovoltaic power sources are manufactured through a monolithic process.

4. The optical integrated circuit of claim 1, wherein the second layer comprises a silicon layer.

5. The optical integrated circuit of claim 1, wherein each optical transmitter comprises an insulating layer and non-insulated voids, wherein the non-insulated voids are metallized to form P and N contacts for the corresponding LED.

6. The optical integrated circuit of claim 1, wherein the each of a length, width, and height of the optical integrated circuit is about 2 millimeters or less.

7. The optical integrated circuit of claim 1, wherein the transmitted data comprises identification data unique to the optical integrated circuit.

8. The optical integrated circuit of claim 1, wherein the light received from the light source has a first wavelength and the transmitted data is transmitted using a data signal having a second wavelength different from the first wavelength.

9. The optical integrated circuit of claim 8, wherein the first wavelength is in the visible spectrum and the second wavelength is in the infrared spectrum.

10. An optical integrated circuit comprising:
one or more photovoltaic power sources configured to be powered by light received from a light source, the one or more photovoltaic power sources further configured to power one or more optical transmitters;
the one or more optical transmitters configured to transmit sensor data to an external optical reading device, wherein each optical transmitter comprises a light emitting diode (LED) formed by a first layer mounted on a second layer having conductive portions therethrough to form p and n regions between the conductive portions, and wherein the one or more optical transmitters are configured to receive the power from the one or more photovoltaic power sources through corresponding conductive portions; and
one or more sensing circuits configured to provide the sensor data to be transmitted to the one or more optical transmitters.

11. The optical integrated circuit of claim 10, wherein the one or more photovoltaic power sources are further configured to power the one or more sensing circuits.

12. The optical integrated circuit of claim 10, wherein the one or more sensing circuits comprise at least one of a dielectric sensor, a temperature sensor, a pH sensor, a redox potential sensor, voltage sensor, current sensor or a light sensor.

13. The optical integrated circuit of claim 10, wherein the one or more sensing circuits comprise a chemical or a biological sensor.

14. The optical integrated circuit of claim 10, wherein the one or more optical transmitters, the one or more sensing circuits, and the one or more photovoltaic power sources are manufactured through a monolithic process.

15. The optical integrated circuit of claim 10, wherein the one or more optical transmitters are within the first layer of the optical integrated circuit, wherein the one or more sensing circuits are within the second layer of the optical integrated circuit, and wherein the one or more photovoltaic power sources are within a third layer of the optical integrated circuit.

16. An optical integrated circuit comprising:
one or more photovoltaic power sources configured to be powered by light received from a light source, the one or more photovoltaic power sources further configured to power one or more optical transmitters;
the one or more optical transmitters configured to transmit data to an external optical reading device, wherein each optical transmitter comprises a light emitting diode (LED) formed by a first layer mounted on a second layer having conductive portions therethrough to form p and n regions between the conductive portions, and wherein the one or more optical transmitters are configured to receive the power from the one or more photovoltaic power sources through corresponding conductive portions; and
one or more clock circuits configured to provide timing signals for the optical integrated circuit.

17. The optical integrated circuit of claim 16, wherein the one or more clock circuits are configured to provide the timing signals based on clock edges extracted from the light received from the light source.

18. The optical integrated circuit of claim 16, wherein the one or more clock circuits comprise a clock photocell.

19. The optical integrated circuit of claim 18, wherein the light received from the light source comprises a laser light, and wherein the clock photocell is configured to extract clock edges from the laser light.

\* \* \* \* \*